United States Patent
Cardinal et al.

(10) Patent No.: US 9,699,599 B2
(45) Date of Patent: Jul. 4, 2017

(54) TRACKING ASSOCIATE LOCATIONS

(71) Applicant: Bank of America Corporation, Charlotte, NC (US)

(72) Inventors: Don Cardinal, San Antonio, TX (US); David M. Grigg, Rock Hill, SC (US)

(73) Assignee: Bank of America Corporation, Charlotte, NC (US)

( * ) Notice: Subject to any disclaimer, the term of this patent is extended or adjusted under 35 U.S.C. 154(b) by 267 days.

(21) Appl. No.: 14/328,079

(22) Filed: Jul. 10, 2014

(65) Prior Publication Data
US 2016/0014553 A1   Jan. 14, 2016

(51) Int. Cl.
| H04W 4/02 | (2009.01) |
| H04W 64/00 | (2009.01) |
| G07F 19/00 | (2006.01) |
| G06K 9/00 | (2006.01) |
| G06Q 10/08 | (2012.01) |

(52) U.S. Cl.
CPC .......... *H04W 4/02* (2013.01); *G06K 9/00919* (2013.01); *G06Q 10/087* (2013.01); *G07F 19/207* (2013.01); *H04W 64/00* (2013.01)

(58) Field of Classification Search
None
See application file for complete search history.

(56) References Cited

U.S. PATENT DOCUMENTS

| | | |
|---|---|---|
| 5,581,630 A | 12/1996 | Bonneau, Jr. |
| 5,991,749 A | 11/1999 | Morrill, Jr. |
| 6,513,015 B2 | 1/2003 | Ogasawara |
| 6,738,628 B1 | 5/2004 | McCall et al. |
| 6,845,361 B1 | 1/2005 | Dowling |
| 7,047,560 B2 | 5/2006 | Fishman et al. |
| 7,111,174 B2 | 9/2006 | Hamid |
| 7,149,533 B2 | 12/2006 | Laird et al. |
| 7,536,316 B2 | 5/2009 | Ozer et al. |
| 7,536,722 B1 | 5/2009 | Saltz et al. |
| 7,543,738 B1 | 6/2009 | Saunders et al. |
| 7,712,657 B1 | 5/2010 | Block et al. |
| 7,774,076 B2 | 8/2010 | Skowronek |
| 7,814,016 B2 | 10/2010 | Pranger |
| 7,904,718 B2 | 3/2011 | Giobbi et al. |
| 7,911,334 B2 | 3/2011 | Busey |
| 7,912,843 B2 | 3/2011 | Murdock et al. |
| 7,979,899 B2 | 7/2011 | Guo et al. |
| 8,009,013 B1 | 8/2011 | Hirschfeld et al. |
| 8,055,551 B2 | 11/2011 | Milgramm et al. |
| 8,073,460 B1 | 12/2011 | Scofield et al. |

(Continued)

FOREIGN PATENT DOCUMENTS

KR   20090050383 A   5/2009

*Primary Examiner* — Jeffrey A Gaffin
*Assistant Examiner* — John M Heffington
(74) *Attorney, Agent, or Firm* — Banner & Witcoff, Ltd.; Michael A. Springs

(57) ABSTRACT

Systems, methods, apparatuses, and computer-readable media configured to determine a location of a user, identify the user and provide additional services based on the determined location and/or identity are provided. In some examples, associate users may be identified and a location of each associate user may be tracked to identify a location of an associate user, confirm the location of the associate user is an expected location, and/or provide location information to a customer of the associate user.

6 Claims, 21 Drawing Sheets

(56) References Cited

U.S. PATENT DOCUMENTS

| | | |
|---|---|---|
| 8,091,778 B1 | 1/2012 | Block et al. |
| 8,145,649 B2 | 3/2012 | Murdock et al. |
| 8,186,578 B1 | 5/2012 | Block et al. |
| 8,201,729 B1 | 6/2012 | Block et al. |
| 8,229,787 B2 | 7/2012 | Ramchandani et al. |
| 8,259,692 B2 | 9/2012 | Bajko |
| 8,260,707 B2 | 9/2012 | Treadwell et al. |
| 8,295,898 B2 | 10/2012 | Ashfield et al. |
| 8,332,232 B2 | 12/2012 | Nickerson et al. |
| 8,369,266 B2 | 2/2013 | Jin et al. |
| 8,401,897 B1 | 3/2013 | Chatterjee |
| 8,413,891 B2 | 4/2013 | Long |
| 8,467,768 B2 | 6/2013 | Mahaffey et al. |
| 8,583,933 B2 | 11/2013 | Granbery |
| 8,590,028 B2 | 11/2013 | Saxena et al. |
| 8,606,712 B2 | 12/2013 | Choudhuri et al. |
| 8,666,821 B2 | 3/2014 | Xie et al. |
| 8,671,001 B1 | 3/2014 | Thompson et al. |
| 8,742,894 B2 | 6/2014 | Seydoux |
| 9,204,257 B1 | 12/2015 | Mendelson |
| 2006/0119469 A1 | 6/2006 | Hirai et al. |
| 2007/0186258 A1 | 8/2007 | Dapper et al. |
| 2007/0186261 A1 | 8/2007 | Geile et al. |
| 2007/0192815 A1 | 8/2007 | Geile et al. |
| 2007/0195689 A1 | 8/2007 | Dapper et al. |
| 2007/0195901 A1 | 8/2007 | Geile et al. |
| 2007/0195902 A1 | 8/2007 | Geile et al. |
| 2007/0201573 A1 | 8/2007 | Geile et al. |
| 2007/0206693 A1 | 9/2007 | Geile et al. |
| 2008/0052151 A1 | 2/2008 | Xie et al. |
| 2008/0114697 A1 | 5/2008 | Black et al. |
| 2009/0252318 A1 | 10/2009 | Smith et al. |
| 2009/0259499 A1 | 10/2009 | Bhojwani et al. |
| 2009/0328052 A1 | 12/2009 | Nguyen et al. |
| 2009/0328182 A1 | 12/2009 | Malakapalli et al. |
| 2010/0017874 A1 | 1/2010 | Piccinini et al. |
| 2010/0042541 A1 | 2/2010 | Kang et al. |
| 2010/0191581 A1 | 7/2010 | Furin et al. |
| 2010/0198725 A1 | 8/2010 | Naccache |
| 2010/0205063 A1 | 8/2010 | Mersky |
| 2010/0277276 A1 | 11/2010 | Bayne et al. |
| 2010/0287250 A1 | 11/2010 | Carlson et al. |
| 2011/0078279 A1* | 3/2011 | Grecco ............ G06Q 30/02 709/217 |
| 2011/0086646 A1 | 4/2011 | Gupta et al. |
| 2011/0202377 A1 | 8/2011 | Maiya et al. |
| 2011/0208657 A1 | 8/2011 | Rao |
| 2011/0246306 A1 | 10/2011 | Blackhurst et al. |
| 2011/0313804 A1 | 12/2011 | Camp et al. |
| 2011/0321031 A1 | 12/2011 | Dournov et al. |
| 2012/0004769 A1 | 1/2012 | Hallenbeck et al. |
| 2012/0047072 A1 | 2/2012 | Larkin |
| 2012/0070041 A1 | 3/2012 | Wang |
| 2012/0076183 A1 | 3/2012 | Dapper et al. |
| 2012/0078673 A1 | 3/2012 | Koke et al. |
| 2012/0078741 A1 | 3/2012 | DeLine |
| 2012/0116929 A1 | 5/2012 | Gventer et al. |
| 2012/0130840 A1 | 5/2012 | Carlier et al. |
| 2012/0136479 A1 | 5/2012 | Signorelli et al. |
| 2012/0143755 A1 | 6/2012 | Burrell |
| 2012/0158297 A1 | 6/2012 | Kim et al. |
| 2012/0195184 A1 | 8/2012 | Dapper et al. |
| 2012/0197773 A1 | 8/2012 | Grigg et al. |
| 2012/0197797 A1 | 8/2012 | Grigg et al. |
| 2012/0197798 A1 | 8/2012 | Grigg et al. |
| 2012/0203892 A1 | 8/2012 | Pignataro et al. |
| 2012/0271692 A1 | 10/2012 | Huang et al. |
| 2012/0278115 A1 | 11/2012 | Acharya et al. |
| 2012/0278234 A1 | 11/2012 | Dent et al. |
| 2012/0320199 A1 | 12/2012 | Kundu et al. |
| 2012/0320214 A1 | 12/2012 | Kundu et al. |
| 2012/0321146 A1 | 12/2012 | Kundu et al. |
| 2012/0323642 A1 | 12/2012 | Camp et al. |
| 2013/0005253 A1 | 1/2013 | Grigg et al. |
| 2013/0030915 A1 | 1/2013 | Statler et al. |
| 2013/0045758 A1 | 2/2013 | Khorashadi et al. |
| 2013/0048724 A1 | 2/2013 | Burnside et al. |
| 2013/0104214 A1 | 4/2013 | Beck et al. |
| 2013/0121131 A1 | 5/2013 | Dapper et al. |
| 2013/0138497 A1 | 5/2013 | Yan et al. |
| 2013/0150006 A1 | 6/2013 | Nunally et al. |
| 2013/0159195 A1 | 6/2013 | Kirillin et al. |
| 2013/0165154 A1 | 6/2013 | Joshi |
| 2013/0173387 A1 | 7/2013 | Adelaar |
| 2013/0173404 A1 | 7/2013 | Scipioni |
| 2013/0173492 A1 | 7/2013 | Leavenworth et al. |
| 2013/0182114 A1 | 7/2013 | Zhang et al. |
| 2013/0182904 A1 | 7/2013 | Zhang et al. |
| 2013/0203383 A1 | 8/2013 | Stopel et al. |
| 2013/0211718 A1 | 8/2013 | Yoo et al. |
| 2013/0217416 A1 | 8/2013 | Matthews, III et al. |
| 2013/0238497 A1 | 9/2013 | Ramachandran et al. |
| 2013/0246301 A1 | 9/2013 | Radhakrishnan et al. |
| 2013/0253818 A1 | 9/2013 | Sanders et al. |
| 2013/0261964 A1 | 10/2013 | Goldman et al. |
| 2013/0275163 A1 | 10/2013 | Kaiser |
| 2013/0282744 A1 | 10/2013 | Hartman et al. |
| 2013/0297422 A1 | 11/2013 | Hunter et al. |
| 2013/0300541 A1 | 11/2013 | Pesonen et al. |
| 2013/0310081 A1 | 11/2013 | Chu |
| 2013/0317778 A1 | 11/2013 | Gupta et al. |
| 2013/0325587 A1 | 12/2013 | Kothari et al. |
| 2013/0328725 A1 | 12/2013 | Wuoti et al. |
| 2013/0332271 A1 | 12/2013 | Hay |
| 2013/0346189 A1 | 12/2013 | Isaacs |
| 2014/0006219 A1 | 1/2014 | Wouhaybi et al. |
| 2014/0020073 A1 | 1/2014 | Ronda et al. |
| 2014/0032297 A1 | 1/2014 | Germann et al. |
| 2014/0032345 A1 | 1/2014 | Moore |
| 2014/0039950 A1 | 2/2014 | Appel et al. |
| 2014/0039951 A1 | 2/2014 | Appel et al. |
| 2014/0046830 A1 | 2/2014 | Orozco et al. |
| 2014/0058914 A1 | 2/2014 | Song et al. |
| 2014/0068785 A1 | 3/2014 | Gventer et al. |
| 2014/0074800 A1 | 3/2014 | Gventer et al. |
| 2014/0081858 A1* | 3/2014 | Block ............ G07F 19/207 705/43 |
| 2014/0105263 A1 | 4/2014 | Geile |
| 2014/0110481 A1 | 4/2014 | Burnside et al. |
| 2014/0114877 A1 | 4/2014 | Montano |
| 2014/0201025 A1 | 7/2014 | Adoni et al. |
| 2014/0222603 A1 | 8/2014 | Hay |
| 2014/0258028 A1 | 9/2014 | Bynum et al. |
| 2014/0270108 A1 | 9/2014 | Riahi et al. |
| 2014/0270109 A1 | 9/2014 | Riahi et al. |
| 2014/0270146 A1 | 9/2014 | Riahi et al. |
| 2014/0279450 A1 | 9/2014 | Gujral |
| 2014/0297527 A1 | 10/2014 | McLaughlin et al. |
| 2014/0309770 A1 | 10/2014 | Signorelli et al. |
| 2014/0351098 A1* | 11/2014 | Shafer ............ G06Q 10/087 705/28 |
| 2015/0059002 A1* | 2/2015 | Balram ............ G06F 3/011 726/28 |
| 2015/0089585 A1 | 3/2015 | Novack |

* cited by examiner

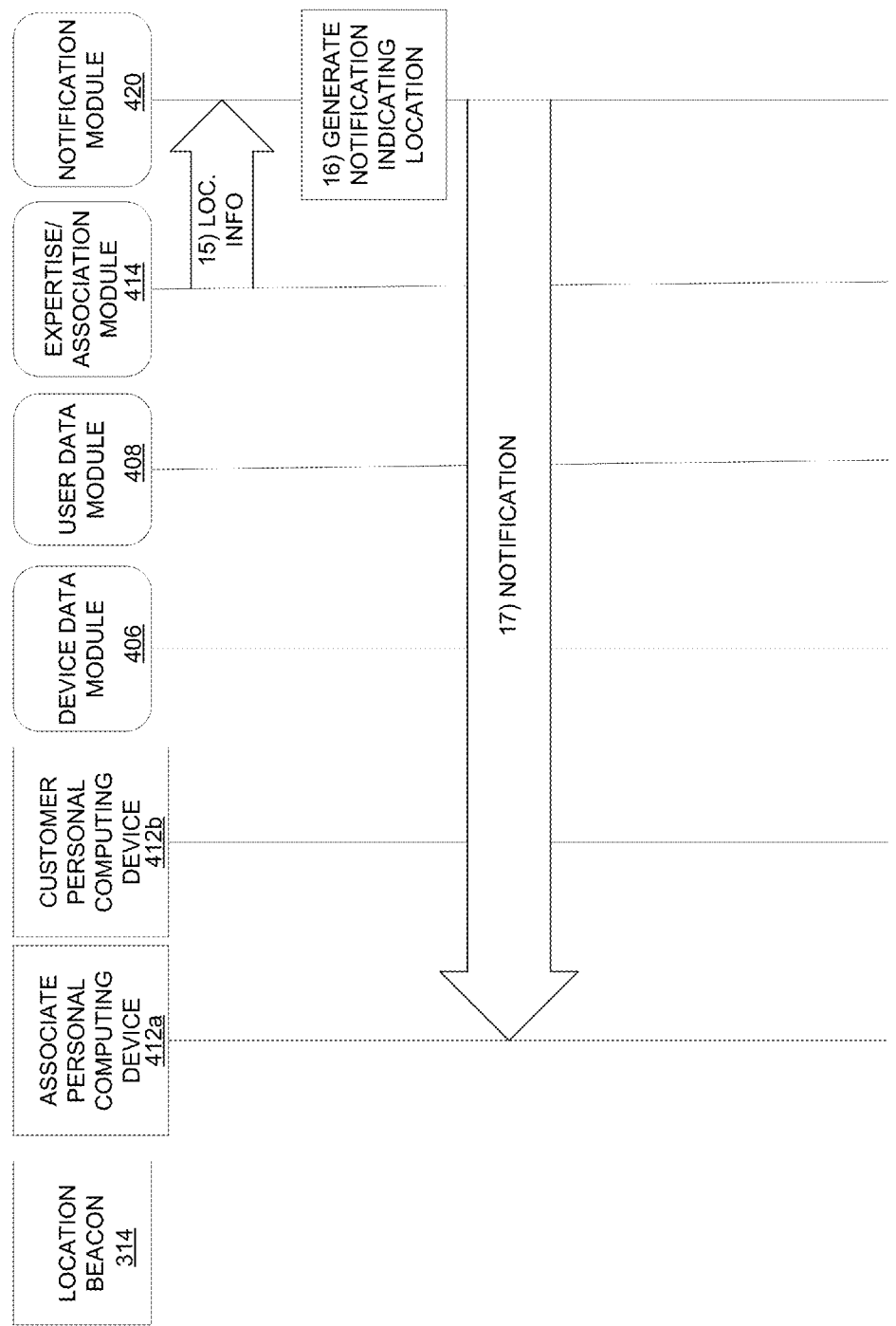

TRACKING ASSOCIATE LOCATIONS

BACKGROUND

Companies that have a service component are often looking for ways to improve the experience that customers have when interacting with the company or its representatives, associates, and the like. Often, when a customer enters a facility, they are looking for the fastest service and the most knowledgeable people to assist them. However, it can be difficult to identify an appropriate associate to provide assistance and, in some examples, determining the location of the associate can be difficult as well.

SUMMARY

Aspects of the disclosure relate to various systems, methods, apparatuses, and computer-readable media configured to use proximity positioning systems to determine a location of a user, identify the user and provide additional services and/or functionality based on the determined location and/or identity. In some examples, a signal may be received or detected. The signal may be a low-power radio signal detectable within a predefined proximity and emitted from a locating beacon. The signal may, in some examples, be detected by a personal computing device of a user. The location of the beacon, and the device detecting the signal, may be determined (e.g., based on previously stored location information associated with the beacon). The location information, as well as a unique identifier associated with the personal computing device of the user, may be used to identify a user associated with the personal computing device and the location of the user. This information may be used to provide additional services and/or functionality to the user.

For instance, in some arrangements, based on the determined location of a personal computing device and an identity of a user associated with the personal computing device, the system may track a location of one or more users. Accordingly, the system, or an individual using the system, may be able to quickly and efficiently determine a location of an associate user.

In some arrangements, the tracking and/or location information may be used to confirm that one or more associate users are in an expected location or position within the location. In some examples, one or more associate users may be identified to assist based on a knowledge area of the identified associate user matching a knowledge area of the inquiry being made. Once the associate user is identified, the associate user may then be notified of the inquiry. In some examples, the associate user may be identified based on a determined location of the associate user (e.g., location tracking information indicates that the associate user is close to an area from which the inquiry originated).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A-5D depict an illustrative event sequence for determining a location of a personal computing device, identifying an associate user associated with the personal computing device, tracking the identified associate user associated with the personal computing device, and identifying an associate user qualified to assist with an inquiry in a knowledge area, according to one or more aspects discussed herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
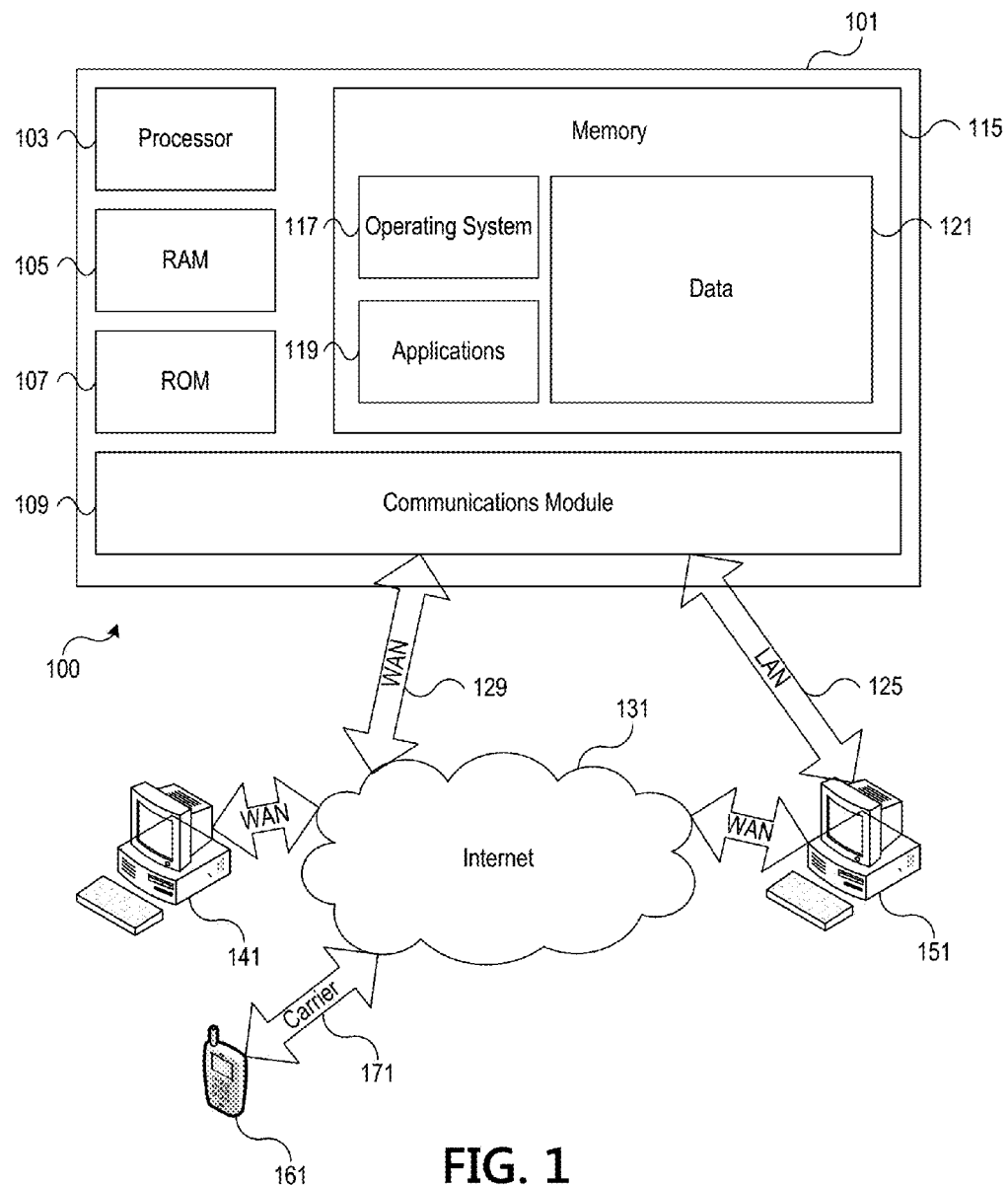
FIG. 1 depicts an illustrative operating environment in which various aspects of the disclosure may be implemented in accordance with one or more aspects discussed herein.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
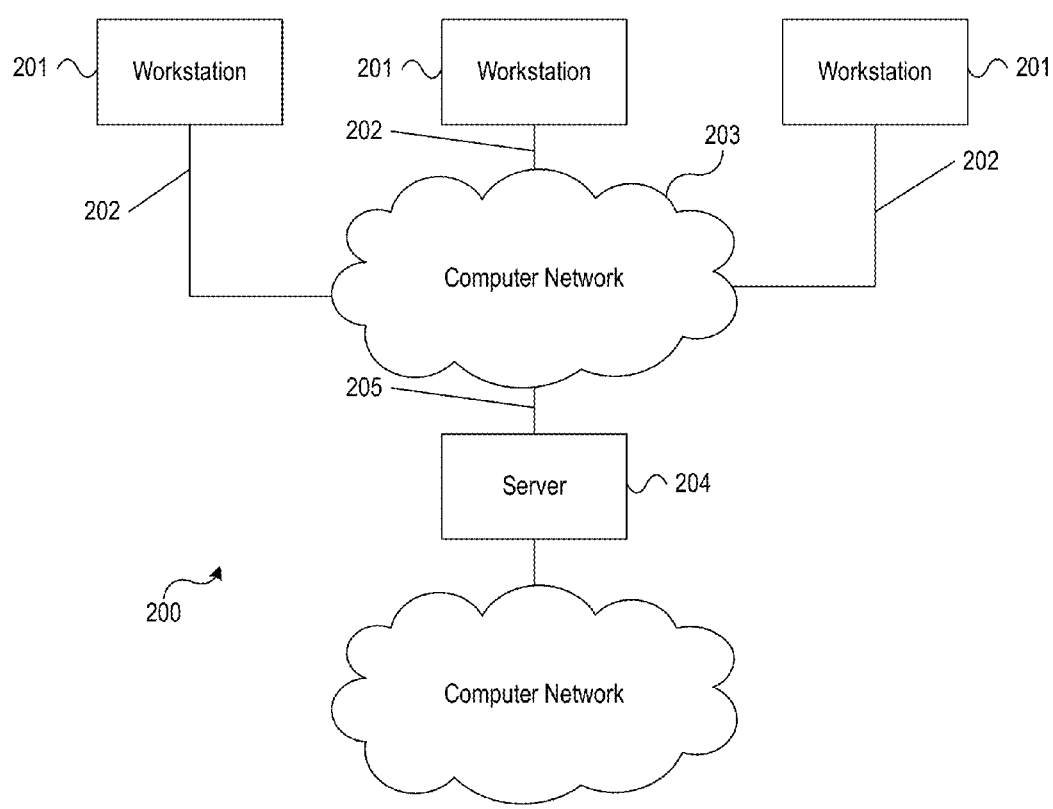
FIG. 2 depicts an illustrative block diagram of workstations and servers that may be used to implement the processes and functions of certain aspects of the present disclosure in accordance with one or more aspects discussed herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
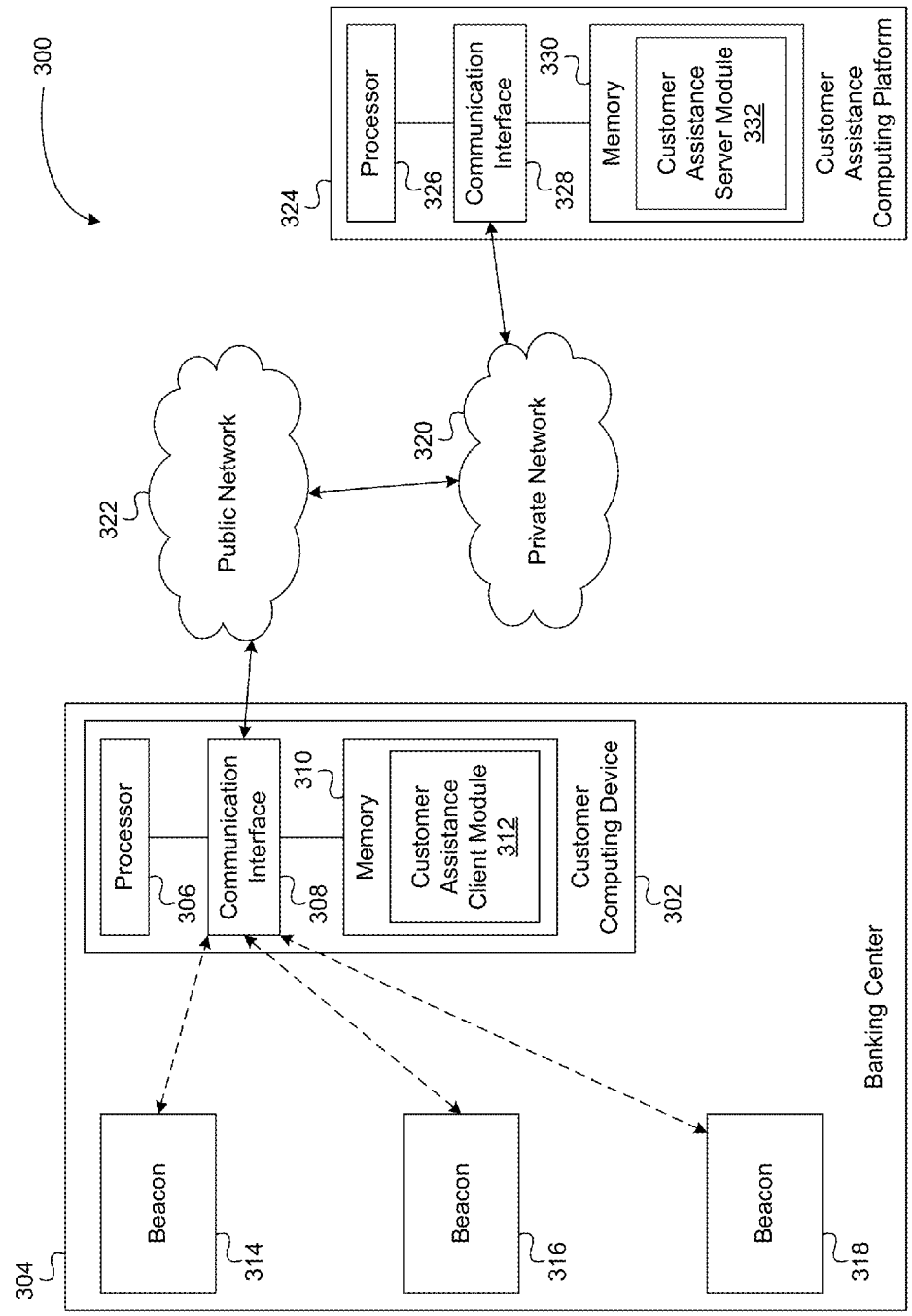
FIG. 3 depicts an illustrative computing environment for a proximity positioning system that may be used to provide location determination and user identification in accordance with one or more aspects discussed herein.

FIG. 3 depicts an illustrative computing environment for a location determination and user identification system in accordance with one or more example embodiments. Referring to FIG. 3, computing environment 300 may include one or more computing devices, such as customer computing device 302. Customer computing device 302 may be any type of computing device capable of receiving a user interface, receiving input via the user interface, and communicating the received input to one or more other computing devices. For example, customer computing device 302 may be a desktop computer, laptop computer, tablet computer, smart phone, or the like. In one or more arrangements, customer computing device 302 may be a personal computing device (e.g., a smart phone, a tablet computer, or any other type of mobile device) that belongs to and/or is used by a customer of a financial institution at and/or near a banking center 304 and/or any other location operated by, controlled by, and/or otherwise associated with the financial institution.

Computing environment 300 also may include one or more location beacons, such as location beacon 314, location beacon 316, and location beacon 318. Each location beacon (e.g., location beacon 314, location beacon 316, and location beacon 318) may be configured to transmit one or more radio signals that may be detected and/or received by other devices located in close proximity of and/or otherwise within a predetermined distance of the particular location beacon. In one or more embodiments, any and/or all of the location beacons included in computing environment 300 (e.g., location beacon 314, location beacon 316, and location beacon 318) may implement Bluetooth Low Energy (also referred to as "Bluetooth LE," "Bluetooth Smart," or "BLE") technology to transmit low-power radio signals. The particular signal(s) transmitted by a particular location beacon may include one or more attributes, such as a unique identifier assigned to and/or otherwise associated with the particular location beacon, that may enable the particular location beacon to be identified by a device receiving the particular signal(s) transmitted by the particular location beacon. As illustrated below, by detecting a particular signal transmitted by a location beacon (which may, e.g., be positioned at a specific location) and subsequently identifying the location beacon transmitting the particular signal, a computing device may be able to determine that it is located at and/or near the specific location where the location beacon is positioned.

For example, in one or more arrangements discussed below, the one or more location beacons (e.g., location beacon 314, location beacon 316, and location beacon 318) may be positioned at and/or near banking center 304, and may be specifically positioned at and/or near different areas of banking center 304, such as at a welcome area, at a teller counter or window, at a waiting area, at an external alcove where an automated teller machine (ATM) is located, at an external window where drive-up services are provided, at a parking lot, and/or in one or more other distinct areas of banking center 304. In addition, each location beacon may transmit a radio signal that may be detected and/or received by other devices at banking center 304, such as customer computing device 302, which may enable such devices to determine that they are present at banking center 304 and/or located at and/or near a particular area of banking center 304.

In one or more embodiments, customer computing device 302 may include at least one processor 306, communication interface 308, and/or memory 310. A data bus may interconnect processor 306, communication interface 308, and/or memory 310. Memory 310 may include one or more program modules comprising instructions that when executed by processor 306 cause customer computing device 302 to perform one or more functions described herein. For example, memory 310 may include customer assistance client module 312, which may include instructions that when executed by processor 306 cause customer computing device 302 to perform one or more functions described herein. Communication interface 308 may include one or more wired and/or wireless communication interfaces (e.g., network interfaces, radio interfaces, or the like) that are configured to support communication between customer computing device 302 and one or more other devices and/or networks. In one or more arrangements, communication interface 308 may include at least one network interface that facilitates communication between customer computing device 302 and one or more devices and/or networks that are located remotely from banking center 304, and communication interface 308 may further include at least one radio interface that facilitates communication between and/or enables customer computing device 302 to receive wireless radio signals from one or more location beacons (e.g., location beacon 314, location beacon 316, and location beacon 318) and/or other radio transmitters that may be located at and/or near banking center 304.

Computing environment 300 also may include one or more computing platforms. For example, computing environment 300 may include customer assistance computing platform 324. Customer assistance computing platform 324 may include one or more computing devices configured to perform one or more of the functions described herein. For example, customer assistance computing platform 324 may include one or more computers (e.g., laptop computers, desktop computers, servers, server blades, or the like).

Computing environment 300 also may include one or more networks, which may interconnect customer computing device 302, customer assistance computing platform 324, and/or one or more other computing devices. For example, computing environment 300 may include private network 320 and public network 322. Private network 320 and/or public network 322 may include one or more sub-networks (e.g., LANs, WANs, or the like). Private network 320 may be associated with a particular organization (e.g., a corporation, financial institution, educational institution, governmental institution, or the like) and may interconnect one or more computing devices associated with the organization. For example, customer assistance computing platform 324 may be associated with an organization, such as the financial institution that operates, controls, and/or is otherwise associated with banking center 304, and private network 320 may be operated by and/or otherwise associated with the organization, and may include one or more networks (e.g., LANs, WANs, VPNs, or the like) that interconnect customer assistance computing platform 324 and one or more other computing devices associated with the organization. Public network 322 may connect private network 320 and/or one or more computing devices connected thereto (e.g., customer assistance computing platform 324) with one or more networks and/or computing devices that are not associated with the organization. For example, customer computing device 302 might not be associated with the organization that operates and/or is associated with private network 320, and public network 322 may include one or more networks (e.g., the Internet) that connect customer computing device 302 to private network 320 and/or one or more computing devices connected thereto (e.g., customer assistance computing platform 324).

Customer assistance computing platform 324 may include at least one processor 326, communication interface 328, and/or memory 330. Memory 330 may include one or more program modules comprising instructions that when executed by processor 326 cause customer assistance computing platform 324 to perform one or more functions described herein. For example, memory 330 may include customer assistance server module 332, which may include instructions that when executed by processor 326 cause customer assistance computing platform 324 to perform one or more functions described herein. Communication interface 328 may include one or more wired and/or wireless communication interfaces (e.g., network interfaces, radio interfaces, or the like) that are configured to support communication between customer assistance computing platform 324 and one or more other devices and/or networks. For example, communication interface 328 may include at least one network interface that facilitates communication between customer assistance computing platform 324 and one or more other devices and/or networks (e.g., private network 320, public network 322, customer computing device 302, and/or other devices and networks).

Figure 4:
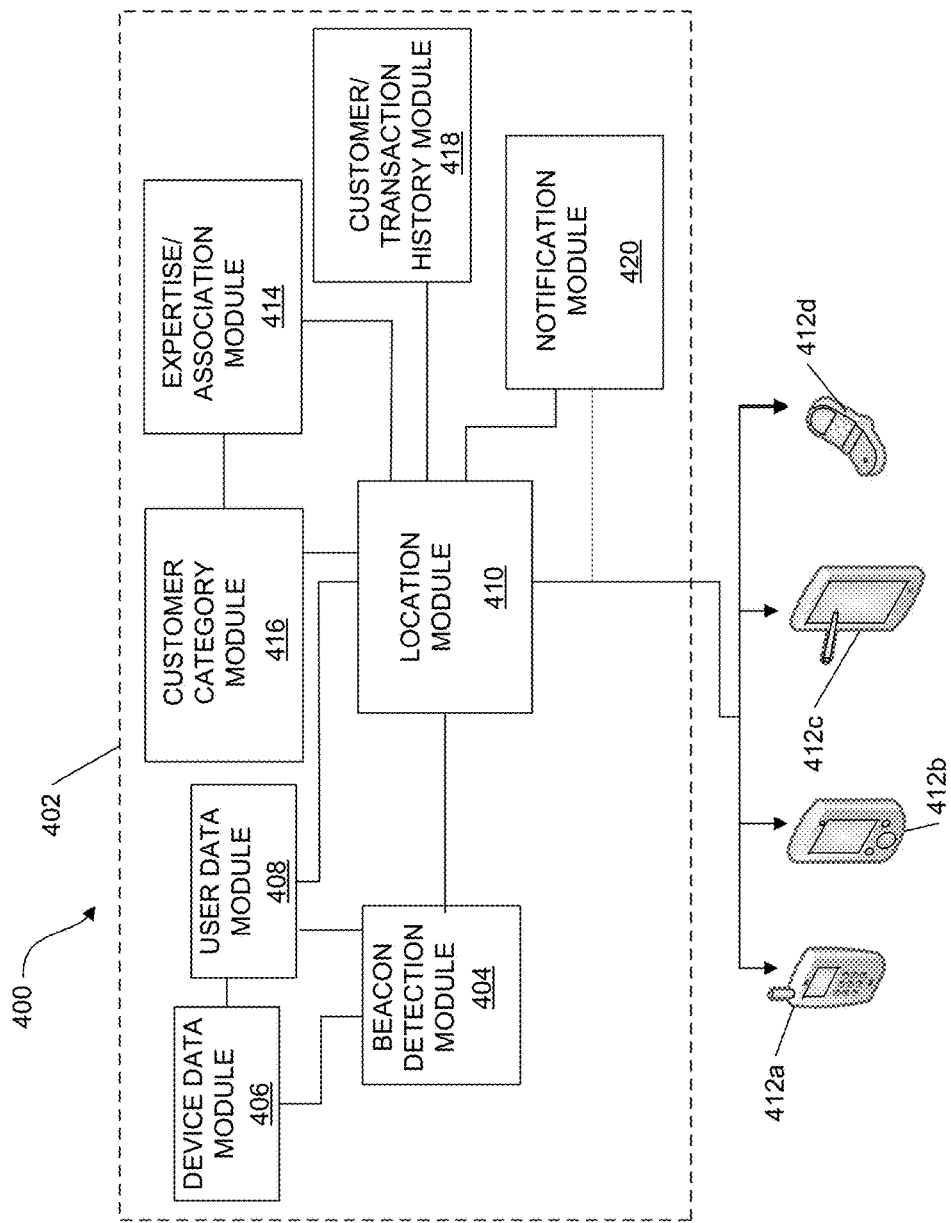
FIG. 4 illustrates one example location determination and user identification system according to one or more aspects discussed herein.

FIG. 4 illustrates one example location determination and user identification system 400 according to one or more aspects described herein. In some examples, the location determination and user identification system 400 may be part of, internal to or associated with an entity 402. The entity 402 may be a corporation, university, government entity, and the like. In some examples, the entity 402 may be a financial institution, such as a bank. Although various aspects of the disclosure may be described in the context of a financial institution, nothing in the disclosure shall be construed as limiting the location determination and user identification system to use within a financial institution. Rather, the system may be implemented by various other types of entities.

Further, some aspects of the location determination and user identification system 400 may be contained in one or more computing devices, servers, or the like. For instance, the location determination and user identification system 400 may include one or more modules that may be implemented in hardware and/or software configured to perform various functions within the system 400. One or more modules may be contained within the same physical device or may be housed in separate devices. Further, although one or more modules may be shown in FIG. 4 as within the entity 402, any of the modules may be located external to the entity 402 but may be associated with the entity. For instance, one or more modules may be associated with a personal computing device of a user. Accordingly, various functionality associated with the module may be performed at the personal computing device which may be located external to the entity but may be associated with the entity by way of a user associated with the device being associated with the entity 402, the device including or running an application, such as a mobile banking application, of the entity 402, and the like. Nothing in the disclosure should be viewed as limiting the one or more modules to a same physical location or a location within an entity.

Location determination and user identification system 400 may include a beacon detection module 404. The beacon detection module 404 may be implemented in hardware and/or software and may be configured to perform various functions within the system 400. For instance, the beacon detection module 404 may be configured to detect and/or receive a signal associated with one or more beacons, such as location beacons 314, 316, 318 in FIG. 3. The location beacons may be arranged within or in proximity to a location (e.g., a branch or banking center) and may be part of a proximity positioning system that may be used to identify a location of a computing device and, accordingly, a user associated with the computing device, as will be discussed more fully below.

The beacon detection module 404 may receive a signal emitted from one or more location beacons and may determine a location of the beacon and/or a personal computing device associated with a user that is within a predefined proximity of one or more locating beacons. For instance, if a personal computing device, such as one of devices 412a-412d is in a location that is within a predefined proximity of one or more locating beacons emitting a signal, the personal computing device 412a-412d (e.g., via the beacon detection module 404) may detect the signal and determine, such as from the received signal, a location of the beacon and/or a location of the device. In some examples, an application on the personal computing device 412a-412d may be used to detect the signal from the beacon and/or determine a location of the beacon and/or personal computing device 412a-412d.

The signal received from the beacon and/or data associated with the signal (such as location data) may be transmitted to a device data module 406. The device data module 406 may be implemented in hardware and/or software configured to perform various functions within the system. For instance, the device data module 406 may receive the signal from the beacon or data associated therewith from the beacon detection module 404 and may determine a unique identifier associated with the personal computing device 412a-412d associated with the beacon detection module 404 that detected the beacon. That is, the device data module 406 may determine a unique identifier, such as a phone number associated with a smart phone 412a, an international mobile station equipment identity (IMEI), or other unique identifier associated with the personal computing device within the predefined proximity of the beacon.

The signal from the beacon detection module 404 and/or the device identifier from the device data module 406 may be transmitted to a user data module 404. In some examples, the user data module 408 may be located remotely from the beacon detection module 404 and/or the device data module 406. For instance, the user data module 408 may be located in, for example, a back office of a financial institution. The user data module 408 may be implemented in hardware and/or software configured to perform various functions within the system 400. For instance, the user data module 408 may receive data from the beacon detection module 404 associated with a location of the beacon and/or a location of the personal computing device detecting the beacon signal. The user data module 408 may also receive the unique identifier retrieved from the device data module 406 to determine a user associated with the device and, therefore, a location of the user associated with the device based on the location of the device.

In some arrangements, a user may register with the system 400. Registration with the system 400 may include registering a unique identifier associated with one or more personal computing devices of the user (e.g., via user input, system detection of the personal computing device, or the like). Registration with the system 400 may also include providing identifying information associated with the user. For instance, a name, address, phone number, online or mobile banking user identification, and the like, may be provided in registering with the system. In examples in which the user is a banking associate, employee, or other associate user, the registration information may include an employee number or other unique identifier used to identify the associate user within the entity. In some examples, the system 400 may obtain registration information directly from the user (e.g., via an online or other direct registration process). Additionally or alternatively, the system 400 may obtain some or all of the registration information from information a user provided to an online banking application, mobile banking application, or the like.

In some arrangements, the registration information may be stored in the user data module 408. Accordingly, upon receiving information associated with a beacon signal and/or a unique identifier associated with a personal computing device, the user data module 408 may determine or identify a user associated with the personal computing device. Thus, the fact that the device associated with the user has detected a beacon signal indicates that the device is (at least likely) within a predefined proximity of the beacon and, thus, the user is also (at least likely) within the same proximity of the beacon. If the beacon is located within a particular location, such as a branch or banking center of a financial institution, this information may be used to determine when a user is within the branch and provide additional services, functionality, etc. to the user based on the identification of the user and determination of the location of the user based on the determined location of the personal computing device associated with the user.

One example of an additional service or functionality that may be provided based on the determined identification and location of the user may include tracking locations of one or more users, such as banking associates, security guards, employees, or the like. Accordingly, the location of any particular individual at any particular time (in real-time or near real-time) may be known, which may aid in managing customer service issues, staffing issues, and the like. For instance, a personal computing device of a banking associate, security guard, or other individual associated with or working for the entity implementing the system (such as a financial institution) may detect a signal from a location beacon. Upon detecting the signal, the user (e.g., associate user) associated with the personal computing device may be identified. Accordingly, the system may then use one or more location positioning systems, such as Global Positioning Systems (GPS) to track the location of the associate user based on the location of the personal computing device associated with the individual. Thus, the financial institution may be able to quickly determine the location of one or more associate users if, for instance, there is a security issue, a customer has a question that only a certain individual may answer, or the like.

Further, this location information of the associate users may be coupled with a determined location and identity of another user, such as a customer user. For instance, similar to the arrangement discussed above, a customer user may enter a banking center or branch of a financial institution and the personal computing device of the customer user may detect a signal emitted from a location beacon. The customer user may then be identified, based on information extracted from the personal computing device of the customer user as discussed herein, and a location of a banking associate or associate user associated with that customer user (e.g., a financial advisor of that customer user) may be determined. Notifications may be transmitted to the customer user and the associate user indicating the locations. These and various other examples will be discussed more fully below.

The location determination and user identification system 400 may include a location module 410. The location module 410 may be implemented in hardware and/or software and may be configured to perform various functions within the system 400. For instance, the location module 410 may receive data associated with the personal computing device of one or more banking associates, security guards, or other individuals or associate users associated with the entity implementing the system (e.g., the financial institution), such as a location based on detection of a beacon, or the like. This information may be used to initiate tracking of the personal computing device. For example, the location module 410 may use GPS, or other location tracking systems, to determine a location of the personal computing device and track the location of the personal computing device. The tracking of the device may be performed with permission from the associate user associated with the personal computing device. Further, the tracking of the personal computing device may be performed during certain time periods, when the associate user/personal computing device is within a certain location, or the like. For instance, the personal computing device may be tracked while the associate user associated with the device is at work (e.g., during business hours, when the personal computing device detects the location beacon, or the like). Accordingly, the system may be able to determine a location of an employee or associate user whose personal computing device is being tracked by the location module 410 at any time throughout the day. This information may then be used to improve customer service, enhance security, and the like.

In some arrangements, tracking of the personal computing device may permit the entity to identify a location of the personal computing device, and thus, the associate user associated with the personal computing device, within a banking center or branch of a financial institution. For instance, the system may determine the location of the device and associate user throughout the building and/or grounds such that the system may be able to determine when the associate user is in his or her office, at a particular work station, in a lunch room, or the like. Accordingly, when the associate user is needed (e.g., to provide customer service) the location of the associate user may be quickly ascertained and may be provided to the customer or other user, as desired.

The location determination and user identification system 400 may further include an expertise/association module 414. The expertise/association module 414 may be implemented in hardware and/or software configured to perform various functions within the system 400. For instance, the expertise/association module 414 may store information associated with the employees or other associate users including areas of expertise, particular customers associated with the employee (e.g., a list of clients or customers associated with each employee), and the like. Thus, when the personal computing device of the associate user detects the location beacon and the identity of the associate user is determined (e.g., by the user data module 408), the system may identify or extract, such as from the expertise/association module 414, customers or customer users associated with that associate user, specific areas of knowledge or expertise of the associate user, and the like. This information may be used to identify associate users available to provide customer service, as well as the particular location of the associate user, as will be discussed more fully below.

The location determination and user identification system 400 may further include a customer category module 416. The customer category module 416 may be implemented in hardware and/or software configured to perform various functions within the system 400. For instance, the customer category module 416 may store information associated with a category assigned to customers or customer users of the entity implementing the system. For example, if the system is being implemented by a financial institution, the customer category module 416 may include information associated with a category of customer assigned to one or more customers of the financial institution. The category assigned may be based on a variety of factors, such as length of time as customer, amount of funds associated with the customer at the financial institution, type of customer (e.g., commercial or personal), number of accounts of the customer, and the like. The category of a customer may be used to assist in identifying an appropriate associate user to provide assistance to the customer, provide an appropriate level of service to the customer, and the like, as will be discussed more fully below.

The customer category module 416 may receive information associated with an identity of a customer user (e.g., from user data module 408) that is associated with a personal computing device that has detected a location beacon at a particular location, such as a banking center. Thus, when the customer user enters the banking center, the customer user's personal computing device may detect the signal from the location beacon, a location of the customer user may be determined, and an identity of the customer user may be determined from this information. Accordingly, the category of the identified customer user may be extracted from the customer category module 416 in order to provide the appropriate customer service to the customer user.

The location determination and user identification system 400 may further include a customer/transaction history module 418. The customer/transaction history module 418 may be implemented in hardware and/or software configured to perform various functions within the system. For instance, the customer/transaction history module 418 may store information associated with historical data of one or more customers or customer users of the entity. In some examples, the customer/transaction history module 418 may store information associated with recent transactions of the customer user (e.g., conducted at the banking center or elsewhere (such as purchases via debit card, online purchases, or the like)).

The customer/transaction history module 418 may further include information associated with recent interactions with the customer. For instance, if the customer recently inquired about a car loan, mortgage, or other product or service, this information may be stored in the customer/transaction history module 418, and may be used to provide improved service to the user. Various other customer information or types of information may also be included in the customer/transaction history module 418 without departing from the invention.

The location determination and user identification system 400 may further include a notification module 420. The notification module 420 may be implemented in hardware and/or software configured to perform various functions within the system 400. For instance, the notification module 420 may be configured to generate and/or transmit one or more notifications to various user, including banking associates, security guards or other associate users, as well as customer users (e.g., users having one or more accounts with the financial institution, and the like) or non-customer users (e.g., users who might not have an account with the financial institution but may use one or more services of the financial institution, such as check cashing services, automated teller machines (ATM), and the like) of the banking center.

In some arrangements, locations of one or more employees or banking associates may be tracked (as discussed above). Accordingly, upon a customer or non-customer user personal computing device detecting a signal from a location beacon at a banking center, the identity of the user may be determined (as discussed above) and a notification may be generated and/or transmitted to the user indicating a location of a banking associate or associate user associated with the user (e.g., as determined by the expertise/association module 414). The notification may be transmitted to the personal computing device 412 of the customer user. Thus, the customer user or non-customer user may proceed directly to the location of the banking associate they are associated with, wish to speak with, or the like. Customers may also include non-customer users, such as those who do not have an account at the financial institution but use one or more services (e.g., ATM, check cashing, or the like) and are registered with the system.

In some arrangements, upon a customer user being identified (e.g., based on the personal computing device of the customer user detecting the location beacon signal), the customer category associated with the customer user may be determined. Further, information associated with one or more areas of expertise, levels of banking associate, or the like, may be retrieved from the expertise/association module 414. Accordingly, the system may identify one or more associate users who may be equipped to handle any issues associated with the identified customer. The identification of the associate user may, in some examples, be made by the expertise/association module 416. In some examples, the location of one or more associate users may be considered in identifying an associate user to receive a notification. For instance, if two associate users are similarly equipped to handle the particular customer and one is in his office and the other is in a lunch room (based on locations determined by the location module 410), the associate in his office may be identified to address or work with the customer user.

A notification may then be generated (by notification module 420) and transmitted to a personal computing device 412 of the associate user (e.g., banking associate) identified indicating that a particular customer has arrived or that a customer of a particular category has arrived. In some examples, the notification may include customer and/or transaction history, such as from customer/transaction history module 418.

These and other arrangements will be discussed more fully below.

FIGS. 5A-5D depict an illustrative event sequence for utilizing a location determination and user identification system in accordance with one or more aspects described herein. The example shown in FIGS. 5A-5D is merely one example sequence and various other steps, processes, or the like, may be included in a sequence without departing from the invention.

Figure 5A:
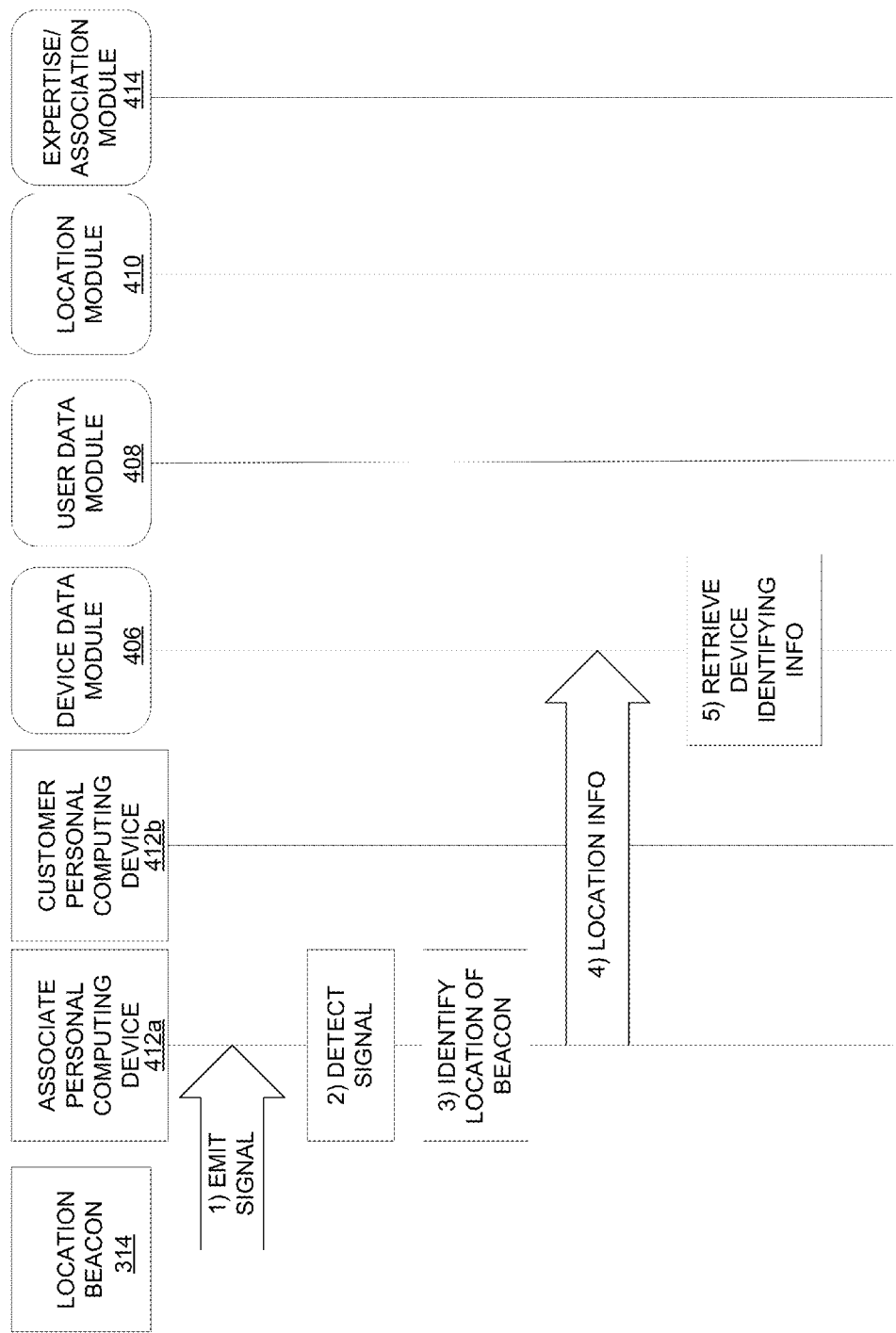

Referring to FIG. 5A at step 1 a signal may be emitted from a location beacon, such as location beacon 314 in FIG. 3. The signal may include data identifying the location beacon and/or a location of the location beacon. In some examples, the location beacon may be located in a first branch or banking center of a financial institution.

At step 2, the signal emitted by the location beacon may be detected, such as by a personal computing device 412a of a banking associate or associate user. As discussed above, the signal emitted by the location beacon may be a low-power radio signal such that detection of the signal might be possible when the personal computing device is within a predefined proximity of the beacon. Accordingly, the personal computing device must be near to the first beacon in order to detect the signal.

Based on the received signal, a location of the location beacon, and, thus, an approximate location of the associate personal computing device, may be determined in step 3. For instance, in some examples, the personal computing device of the associate may include an application configured to communicate with the beacon and/or receive and/or provide information associated with the beacon, location, and the like, to a system associated with an entity, such as a financial institution. Example applications may include online banking applications and/or mobile banking applications. Accordingly, the application may detect the signal associated with the beacon and determine a location of the beacon (and thus an approximate location of the personal computing device). Determining the location of the location beacon may be based on records stored on the personal computing device of the associate, or accessible via the online banking application or mobile banking application or other system or connection, identifying locations of beacons. For instance, the location of beacons in each branch of the financial institution may be accessible via the online banking application or mobile banking application.

Although the example above includes identifying the location of the location beacon and/or the personal computing device by the personal computing device (or application associated therewith), in some arrangements, the signal or data associated with the signal, may be transmitted from the personal computing device of the associate to another computing device or server in order to identify the location. For instance, the signal or data associated therewith may be transmitted (in some examples, from the personal computing device) to a server at a back office of a financial institution, such as customer assistance computing platform 324 in FIG. 3. The location of the location beacon, and approximate location of the personal computing device, may then be determined at the remote server or platform using processes similar to those discussed above.

At step 4, the determined location of the location beacon may be transmitted, for instance to a device data module 406, to retrieve device identifying information in step 5. As discussed above, device identifying information may include IMEI of the device, and the like.

Figure 5B:
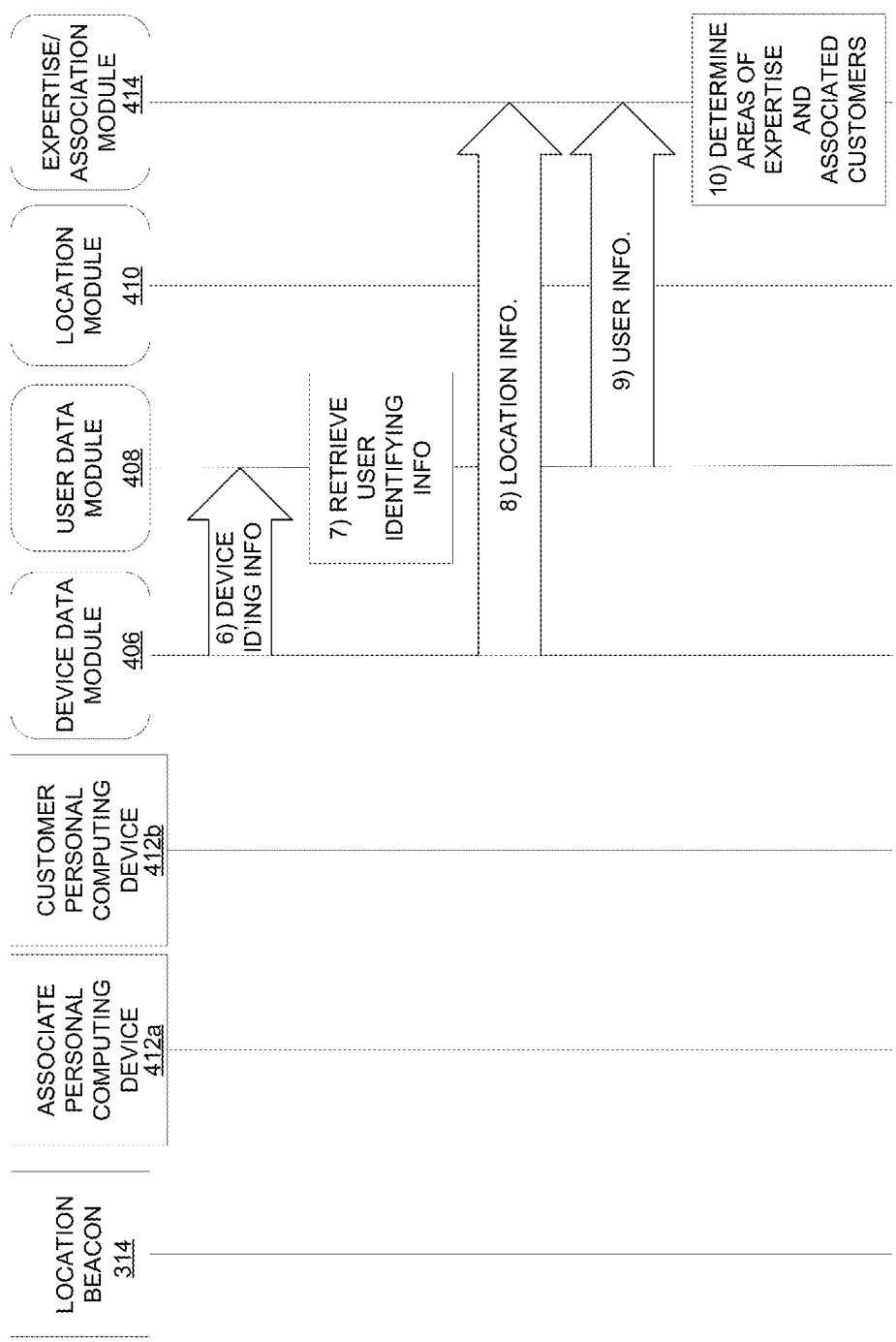

Referring to FIG. 5B, the device identifying information retrieved associated with the personal computing device, may be transmitted, for instance, to the user data module 408 in step 6. The user data module 408 may receive the device identifying information and use it to identify a banking associate or associate user associated with the personal computing device. For instance, the device identifying information may be used to determine an identity of a banking associate or other associate user associated with the personal computing device. Information associated with the identified user may be retrieved in step 7.

Figure 5C:
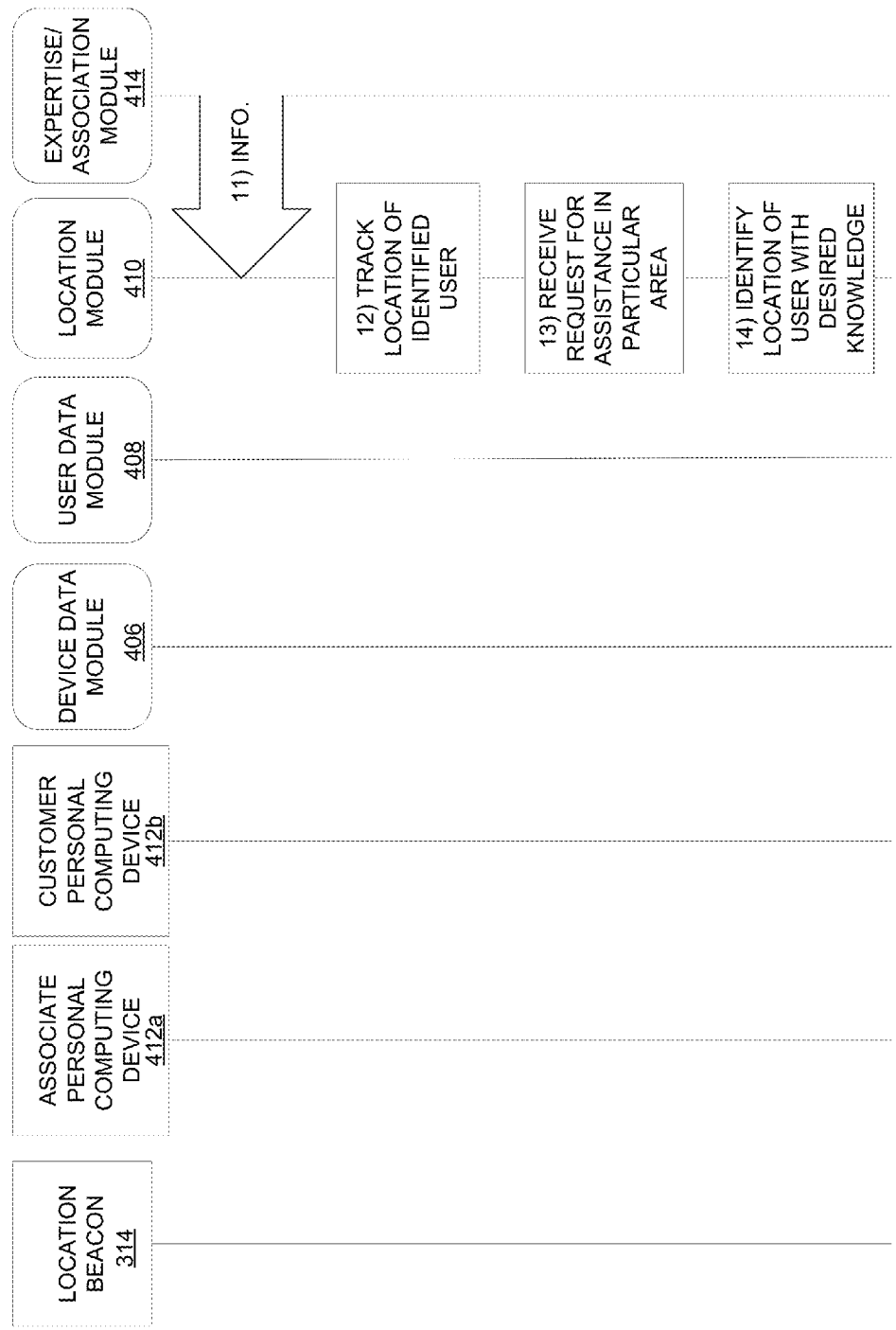

The location information may be transmitted to the expertise/association module 414 in step 8 and the identification information may be transmitted to the expertise/association module in step 9. One or more areas of expertise, as well as particular clients or customers, or types or categories of customers, associated with the identified associate user may be determined by the expertise/association module in step 10. Referring to FIG. 5C, in step 11, the determined expertise and/or association information may be transmitted to the location module.

In step 12, a location of the identified associate user may be tracked, as discussed above. For instance, GPS, or other systems, may be used to follow or track a location of the associate user throughout the day (e.g., while the associate is at work, within the banking center, within the predefined proximity of the location beacon, and the like). This may allow the system to quickly determine the location of any associate user throughout the workday. This may be used to verify the location of some employees (e.g., verify that security guards are at an expected location at a particular time of day) and/or identify a location of an associate user whose assistance may be needed (e.g., identify a location of an associate user with particular expertise to handle a customer issue), as will be discussed more fully herein.

It should be noted that the above described steps in the sequence may be repeated for a plurality of banking associate or associate users and the associated personal computing devices of those associate users. Accordingly, the location module may track a plurality of associate users throughout the day or at any given time.

In step 13, a request for assistance in a particular area or with a particular product or service may be received. In some examples, the request may be received from another personal computing device (e.g., a customer user personal computing device). In other examples, the request may be received from another computing device or system associated with the entity (e.g., from a teller or other banking associate who has a question or needs assistance).

In step 14, a location of an associate user with the desired knowledge may be determined. The determination may be made by matching the knowledge area associated with the inquiry to the identified knowledge areas or areas of expertise of the one or more associate users being tracked by the system. With reference to FIG. 5D, in step 15, the location of the user with the desired knowledge or expertise may be transmitted to a notification module 420. The notification module 420 may generate a notification including a location of the associate user and/or information associated with the inquiry in step 16. In step 17, the notification may be transmitted to one or more computing devices. For instance, the notification may be transmitted to a personal computing device of the associate user who is identified as having the desired knowledge or expertise. The notification may include one or more details about the inquiry and may request the associate user to move to a particular location (e.g., a location of the customer user). Additionally or alternatively, the notification may be transmitted to a computing device of another banking associate or associate user who is making the inquiry or is working with the customer who is making the inquiry and/or the personal computing device of the customer user.

Figure 6:
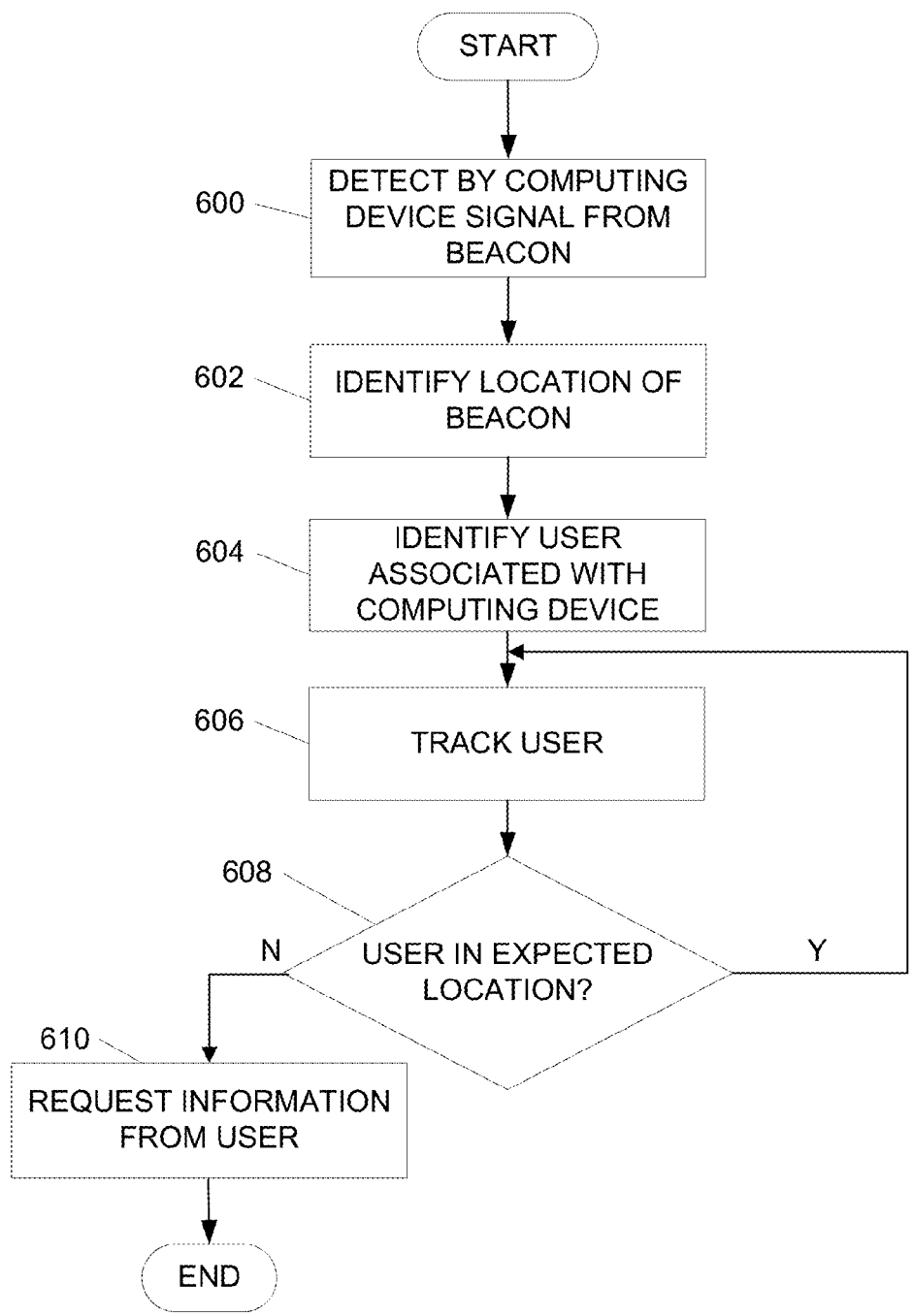
FIG. 6 illustrates one example method of tracking locations of various employees or associate users according to one or more aspects discussed herein.

FIG. 6 illustrates one example method of tracking locations of various employees or associate users according to one or more aspects described herein. In step 600, a signal from a location beacon may be detected by a personal computing device. As discussed above, the signal may be a low-power radio signal that may only be detectable when the detecting device (e.g., the personal computing device) is within a predetermined proximity of the beacon, which may be a relatively small distance. In step 602, the location of the beacon and, thus, the personal computing device, may be determined. The location may be determined in various ways, as discussed above.

In step 604, a user associated with the personal computing device may be identified. As discussed above, the user may be identified based on the unique identifier associated with the personal computing device, registration records or information, online or mobile banking information provided, or the like. In some examples, the user may be an associate or other employee of the entity at which the beacon is located (e.g., an employee or banking associate of the financial institution at which the location beacon is positioned).

Once the identity of the associate user is determined, the associate user may be tracked in step 606. Tracking of the user may include using GPS or other technology to follow or periodically determine a location of the personal computing device of the associate user. Accordingly, a position of the associate user within the banking center or branch (e.g., within the location at which the location beacon is positioned) may be determined at any time. Thus, the system may identify the location of any employee at any time, which may aid in locating employees to provide assistance to customers, ensure that employees are at the appropriate location, or the like.

For instance, a security guard may have a designated location within a building. The system described herein may be used to track the location of the security guard in order to determine his or her location at any time. Thus, the system can ensure that the guard is in the appropriate location or identify the location of the security guard as desired.

In step 608, a determination may be made as to whether one or more users or associates being tracked are in an expected location. If so, the system may continue tracking the user (e.g., return to step 606). If not, additional information may be requested from the user in step 610. For instance, a request for a current location may be transmitted to the personal computing device of the user. The request may include a request for a reason the user is not in the expected location, when the user is expected to return to a designated location, or the like. This may permit the system to confirm that employees are in an expected location and, if not, to determine why they are not in the expected location.

Figure 7:
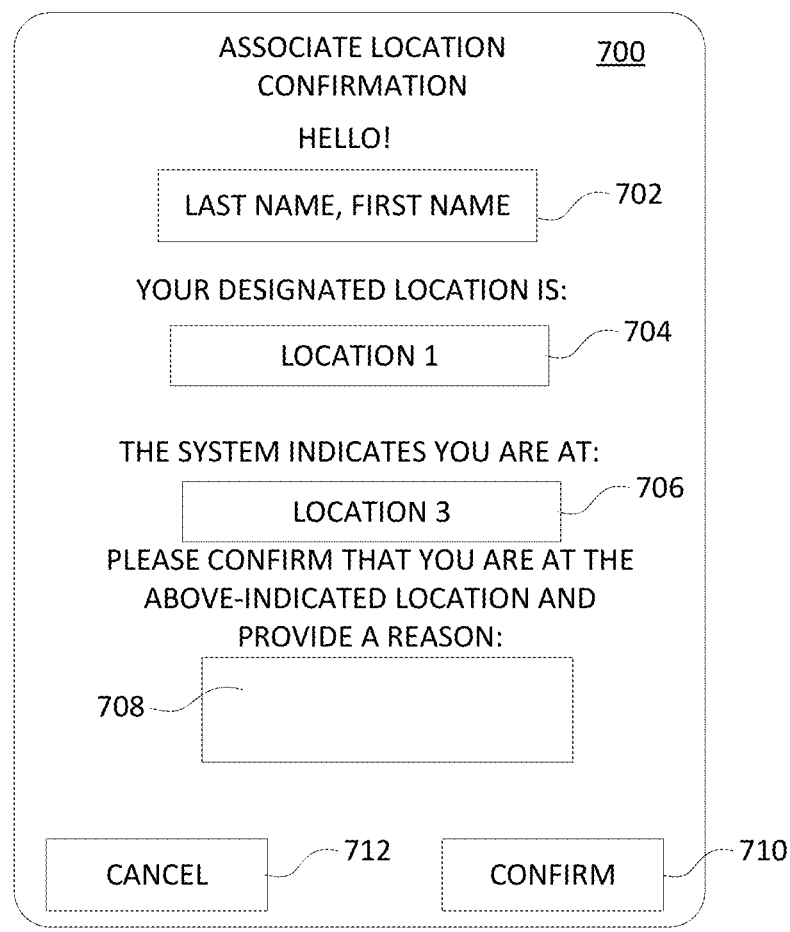
FIG. 7 illustrates one example user interface that may be transmitted to an associate user determined to be away from an expected location, according to one or more aspects described herein.

FIG. 7 illustrates one example user interface that may be transmitted to a user who is determined to be away from an expected location. The interface 700 includes field 702 in which the name of the associate user being tracked and determined to be away from an expected location is displayed. The interface 700 may further include field 704 in which the expected location of the associate user may be displayed. In field 706, the location determined by the system (e.g., by tracking the associate user or personal computing device associated with the associate user) may be displayed. Field 708 provides a region in which the associate user may provide a reason for being at a location other than the expected location. Once the information is provided, the user may select "CONFIRM" option 710 to confirm his or her current location. Alternatively, the associate user may select "CANCEL" option 712 to leave the interface 700. Selection of "CANCEL" option 712 may prompt one or more supervisors or other personnel to attempt to locate the associate user to visually confirm the location of the associate user.

Figure 8:
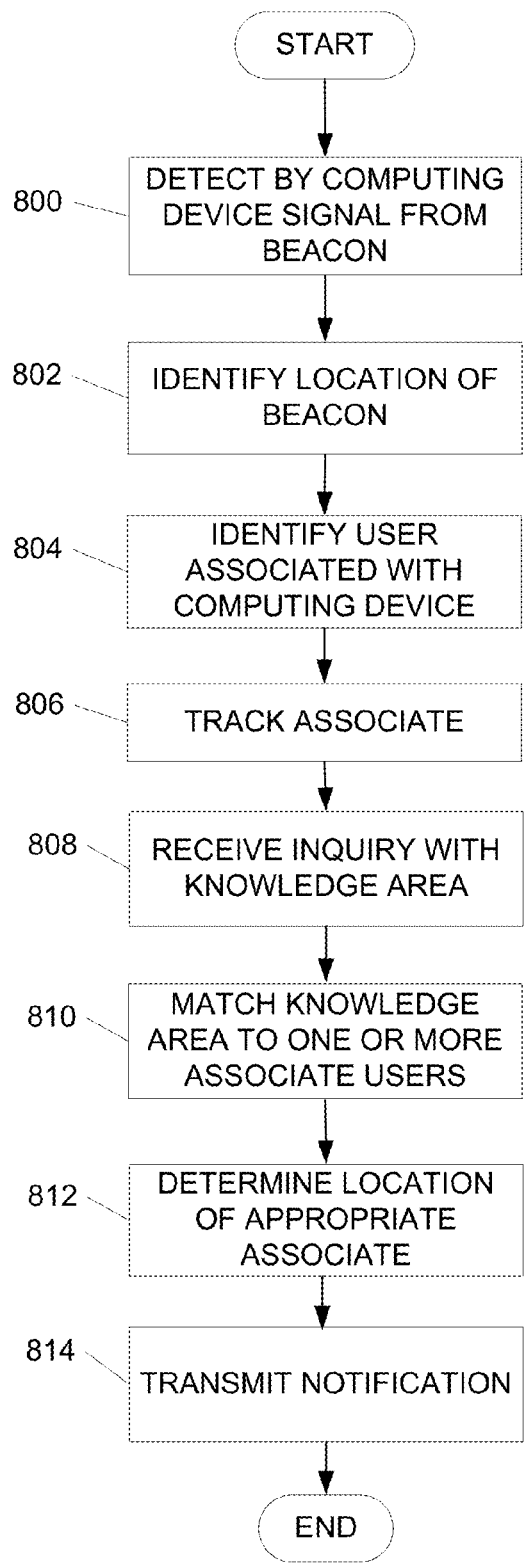
FIG. 8 illustrates one example method of determining a location of an associate user having a desired expertise or knowledge, according to one or more aspects described herein.

FIG. 8 illustrates one example method of determining a location of an associate user having a desired expertise or knowledge according to one or more aspects described herein. In step 800, a signal from a location beacon may be detected by a personal computing device. As discussed above, the signal may be a low-power radio signal that may only be detectable when the detecting device (e.g., the personal computing device) is within a predetermined proximity of the beacon, which may be a relatively small distance. In step 802, the location of the beacon and, thus, the personal computing device, may be determined. The location may be determined in various ways, as discussed above.

In step 804, a user associated with the personal computing device may be identified. As discussed above, the user may be identified based on the unique identifier associated with the personal computing device, registration records or information, online or mobile banking information provided, or the like. In some examples, the user may be an associate or other employee of the entity at which the beacon is located (e.g., an employee or banking associate of the financial institution at which the location beacon is positioned).

Once the identity of the user is determined, the associate user may be tracked in step 806. Tracking of the associate user may include using GPS or other technology to follow or periodically determine a location of the personal computing device of the associate user. Accordingly, a position of the associate user within the banking center or branch (e.g., within the location at which the location beacon is positioned) may be determined at any time. Thus, the system may identify the location of any employee at any time, which may aid in locating employees to provide assistance to customers, ensure that employees are at the appropriate location, or the like.

In some examples, the above steps may be applied to a plurality of personal computing devices associated with a plurality of users associated with the entity (e.g., employees or associates of the entity). Accordingly, the location of a plurality of employees or associate users may be tracked.

In step 808, an inquiry may be received. The inquiry may be received from a variety of sources. For instance, the inquiry may be received from a customer in need of assistance, from a banking associate who needs assistance or has a question, or the like. The inquiry may include a particular knowledge area or area of expertise (e.g., loans, mortgages, student loans, auto loans, investments, retirement planning, or the like). Accordingly, the system may match the identified knowledge area in the inquiry with one or more associate users associated with that knowledge area (such as via expertise/association module 414 in FIG. 4) to identify one or more associate users having that knowledge area in step 810.

In step 812, the location of the one or more identified associate users from step 810 may be determined. In some examples, the system may identify an associate user closest to the location of the customer (e.g., closest to a computing device from which the inquiry was received). In step 814, a notification may be transmitted to the one or more identified associate users. The notification may include information associated with the inquiry and may be transmitted to a personal computing device of the one or more identified associate users. The notification may further include a location of a customer user or other individual requesting assistance or making the inquiry. The notification may include a request for the associate user to attend to the customer making the inquiry or indicate that they are otherwise engaged and cannot assist at that time.

Figure 9:
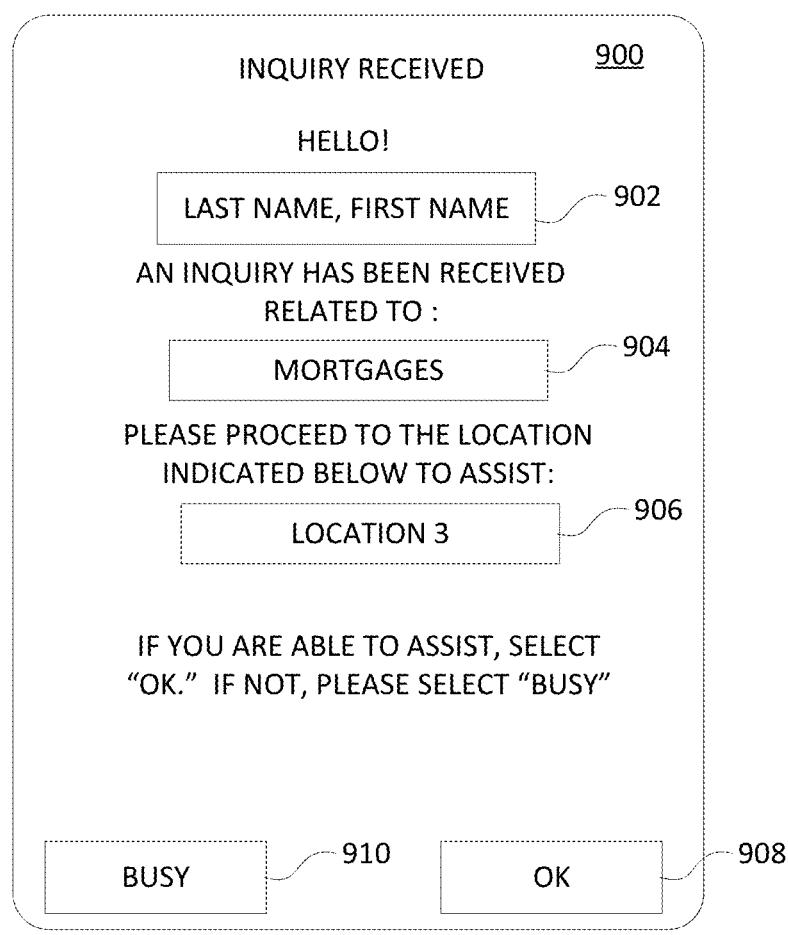
FIG. 9 illustrates one example user interface that includes a notification that may be transmitted to an identified associate user having a desired knowledge or expertise, according to one or more aspects described herein.

For instance, FIG. 9 illustrates one example user interface that includes a notification provided to an associate user, as discussed above with respect to claim 8. For instance, the notification may be transmitted to a personal computing device of the associate user. The interface 900 includes field 902 in which a name of the associate user to which the notification has been transmitted is displayed. Field 904 identifies the knowledge area associated with the inquiry and field 906 provides a location from which the inquiry originated (e.g., a location of a personal computing device transmitting the inquiry, a teller window from which the inquiry originated, or the like). If the associate user is available to assist in the inquiry, the associate user may select "OK" option 908. If the associate is unable to assist at the time, the associate user may select "BUSY" option 910. In some arrangements, selection of option 910 may prompt the system to identify another user associate having knowledge or expertise in the area of the inquiry and transmit a similar notification to the other identified associate user.

FIGS. 10A-10E depict another illustrative event sequence for utilizing a location determination and user identification system in accordance with one or more aspects described herein. The example shown in FIGS. 10A-10E is merely one example sequence and various other steps, processes, or the like, may be included in a sequence without departing from the invention.

Figure 10A:
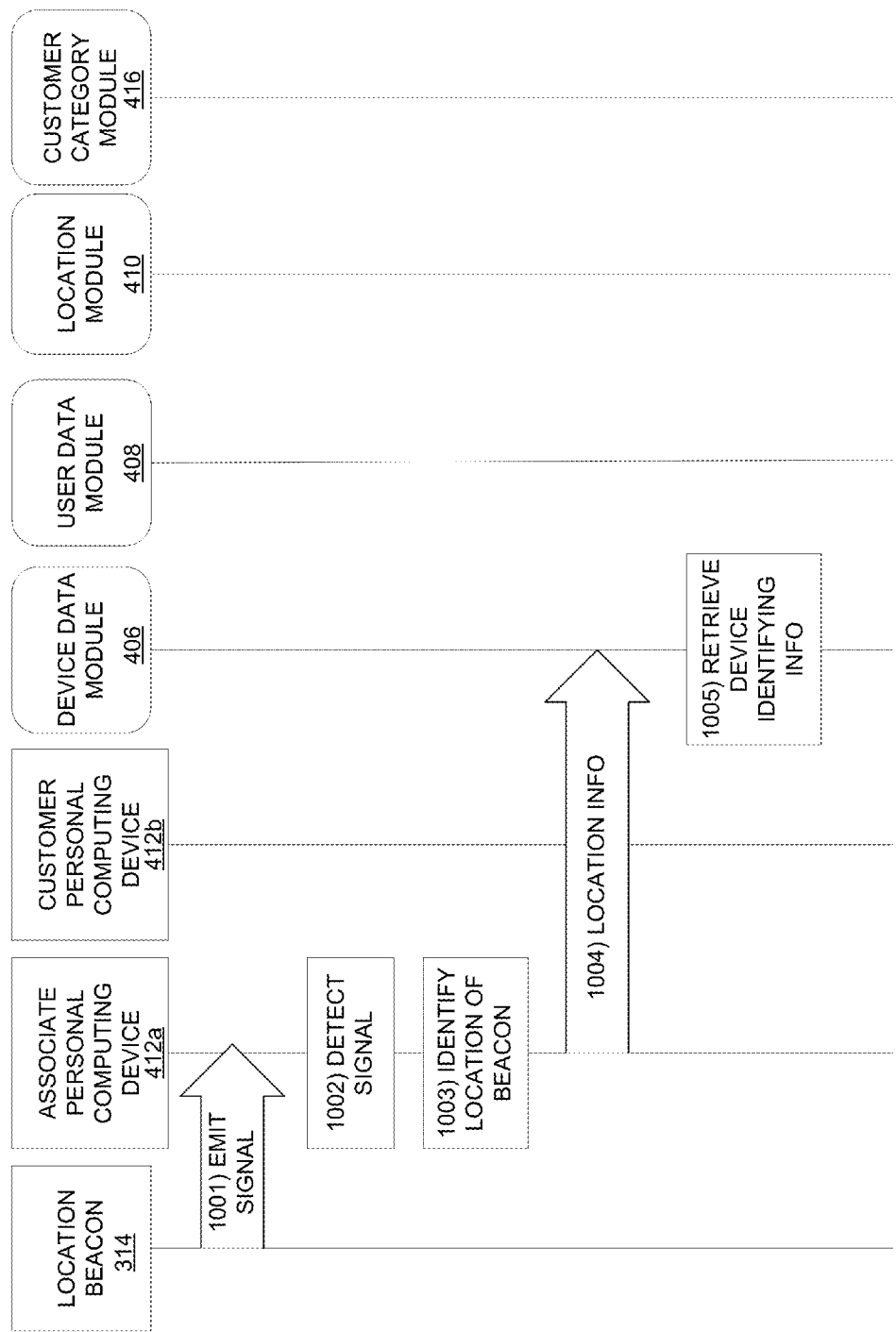
FIGS. 10A-10E depict an illustrative event sequence for determining a location of a customer user, identifying the customer user, and determining a location of an associate user associated with the identified customer user, according to one or more aspects described herein.

Similar to FIG. 5A, and referring to FIG. 10A, at step 1001 a signal may be emitted from a location beacon, such as location beacon 314 in FIG. 3. The signal may include data identifying the location beacon and/or a location of the location beacon. In some examples, the location beacon may be located in a first branch or banking center of a financial institution.

At step 1002, the signal emitted by the location beacon may be detected, such as by a personal computing device of a banking associate 412a. As discussed above, the signal emitted by the location beacon may be a low-power radio signal such that detection of the signal might be possible when the personal computing device is within a predefined proximity of the beacon. Accordingly, the personal computing device must be near to the first beacon in order to detect the signal.

Based on the received signal, a location of the location beacon, and, thus, an approximate location of the associate personal computing device, may be determined in step 1003. For instance, in some examples, the personal computing device of the associate may include an application configured to communicate with the beacon and/or receive and/or provide information associated with the beacon, location, and the like, to a system associated with an entity, such as a financial institution. Example applications may include online banking applications and/or mobile banking applications. Accordingly, the application may detect the signal associated with the beacon and determine a location of the beacon (and thus an approximate location of the personal computing device). Determining the location of the location beacon may be based on records stored on the personal computing device of the associate, or accessible via the online banking application or mobile banking application, identifying locations of beacons. For instance, the location of beacons in each branch of the financial institution may be accessible via the online banking application or mobile banking application.

Although the example above includes identifying the location of the location beacon and/or the personal computing device by the personal computing device (or application associated therewith), in some arrangements, the signal or data associated with the signal, may be transmitted from the personal computing device of the associate to another computing device or server in order to identify the location. For instance, the signal or data associated therewith may be transmitted (in some examples, from the personal computing device) to a server at a back office of a financial institution, such as customer assistance computing platform 324 in FIG. 3. The location of the location beacon, and approximate location of the personal computing device, may then be determined at the remote server or platform using processes similar to those discussed above.

At step 1004, the determined location of the location beacon may be transmitted, for instance to a device data module 406, to retrieve device identifying information in step 1005. As discussed above, device identifying information may include IMEI of the device, and the like.

Figure 10B:
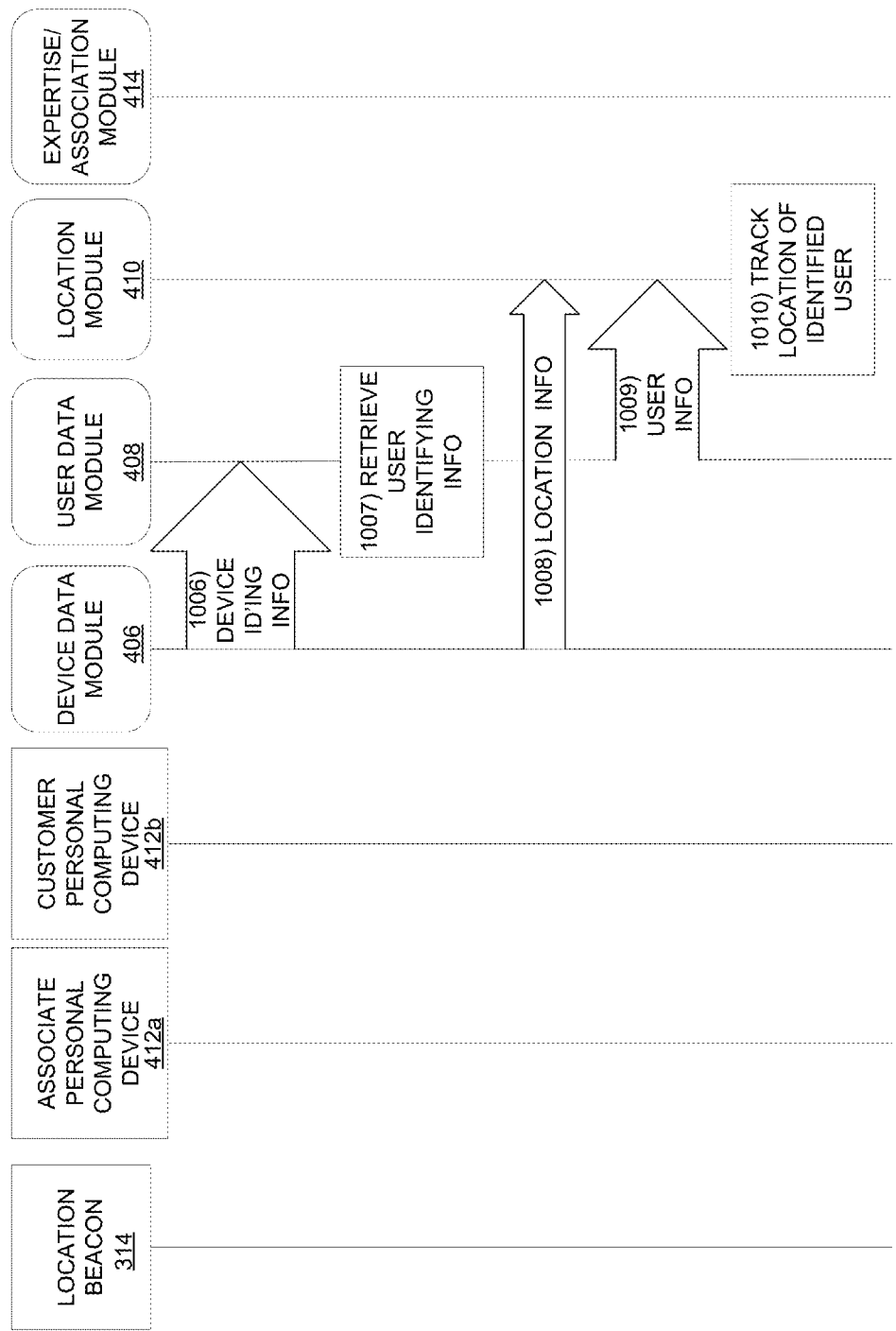

Referring to FIG. 10B, the device identifying information retrieved associated with the personal computing device, may be transmitted, for instance, to the user data module 408 in step 1006. The user data module 408 may receive the device identifying information and use it to identify a banking associate or associate user associated with the personal computing device. For instance, the device identifying information may be used to determine an identity of a banking associate or other employee associated with the personal computing device. Information associated with the identified user may be retrieved in step 1007.

In step 1008, the determined location information may be transmitted to location module 410 and in step 1009, the determined user information may be transmitted to location module 410. A location of the identified associate user may be tracked, as discussed above, in step 1010. For instance, GPS, or other systems, may be used to follow or track a location of the associate user throughout the day (e.g., while the associate is at work or within the banking center). This may allow the system to quickly determine the location of any associate user throughout the workday. This may be used to verify the location of some employees (e.g., verify that security guards are at an expected location at a particular time of day) and/or identify a location of an associate user whose assistance may be needed (e.g., identify a location of an associate user with particular expertise to handle a customer issue), as will be discussed more fully herein. In some examples, one or more areas of expertise associated with the associate user may also be determined, as discussed above with respect to FIGS. 5A-5D.

It should be noted that the above described steps in the sequence may be repeated for a plurality of banking associate or associate users and the associated personal computing devices of those associate users. Accordingly, the location module may track a plurality of associate users throughout the day or at any given time.

Figure 10C:
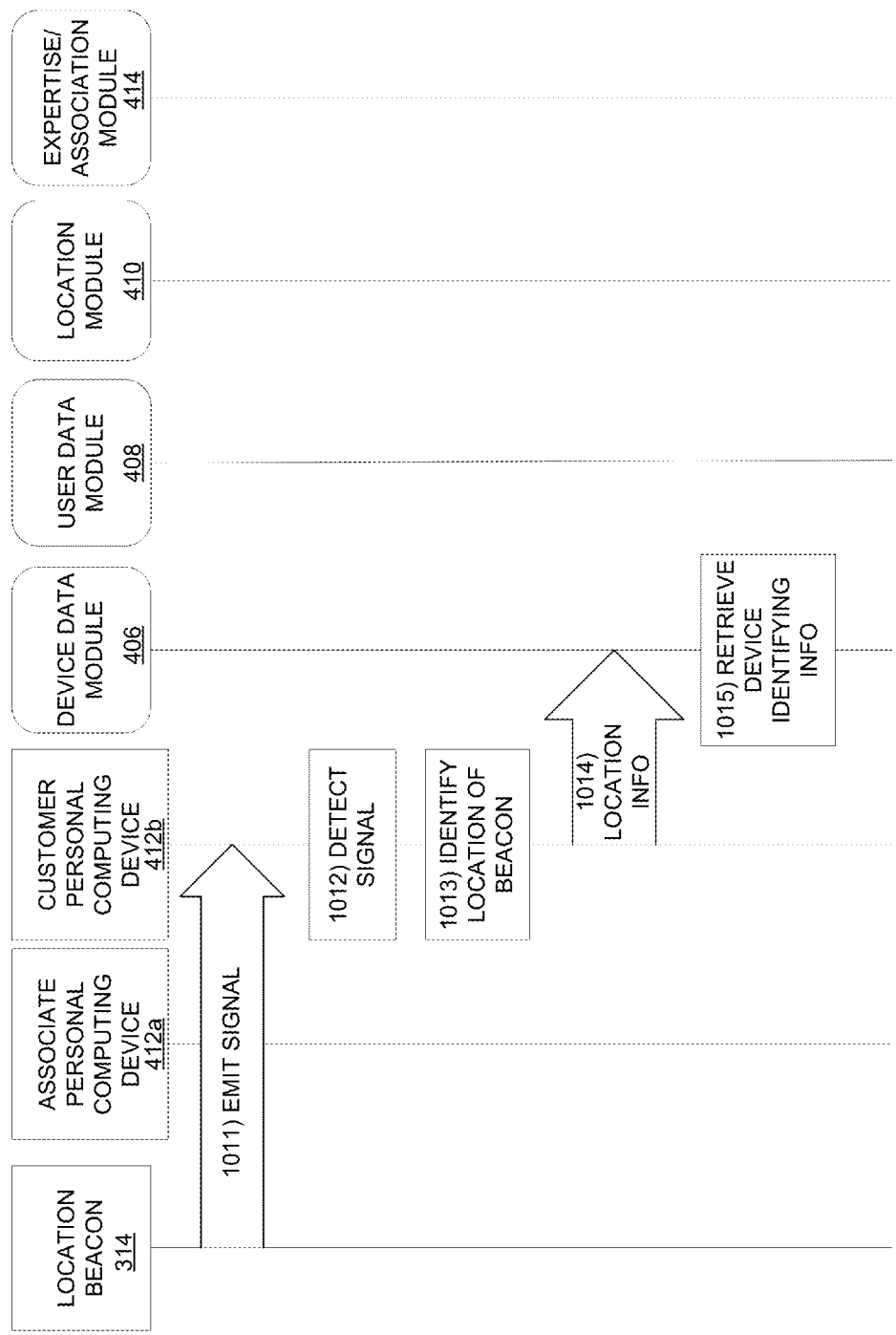

Referring to FIG. 10C, in step 1010, similar to step 1001, a signal may be emitted from a location beacon, such as location beacon 314 in FIG. 3. The signal may include data identifying the location beacon and/or a location of the location beacon. In some examples, the location beacon may be located in a first branch or banking center of a financial institution.

At step 1012, the signal emitted by the location beacon may be detected, such as by a personal computing device of a customer user 412b. As discussed above, the signal emitted by the location beacon may be a low-power radio signal such that detection of the signal might be possible when the personal computing device is within a predefined proximity of the beacon. Accordingly, the personal computing device must be near to the first beacon in order to detect the signal.

Based on the received signal, a location of the location beacon, and, thus, an approximate location of the customer personal computing device, may be determined in step 1013.

For instance, in some examples, the personal computing device of the customer user may include an application configured to communicate with the beacon and/or receive and/or provide information associated with the beacon, location, and the like, to a system associated with an entity, such as a financial institution. Example applications may include online banking applications and/or mobile banking applications. Accordingly, the application may detect the signal associated with the beacon and determine a location of the beacon (and thus an approximate location of the personal computing device). Determining the location of the location beacon may be based on records stored on the personal computing device of the customer user, or accessible via the online banking application or mobile banking application, identifying locations of beacons. For instance, the location of beacons in each branch of the financial institution may be accessible via the online banking application or mobile banking application.

Although the example above includes identifying the location of the location beacon and/or the personal computing device by the personal computing device (or application associated therewith), in some arrangements, the signal or data associated with the signal, may be transmitted from the personal computing device of the associate to another computing device or server in order to identify the location. For instance, the signal or data associated therewith may be transmitted (in some examples, from the personal computing device) to a server at a back office of a financial institution, such as customer assistance computing platform 324 in FIG. 3. The location of the location beacon, and approximate location of the personal computing device, may then be determined at the remote server or platform using processes similar to those discussed above.

At step 1014, the determined location of the location beacon may be transmitted, for instance to a device data module 406, to retrieve device identifying information in step 1015. As discussed above, device identifying information may include IMEI of the device, and the like.

Figure 10D:
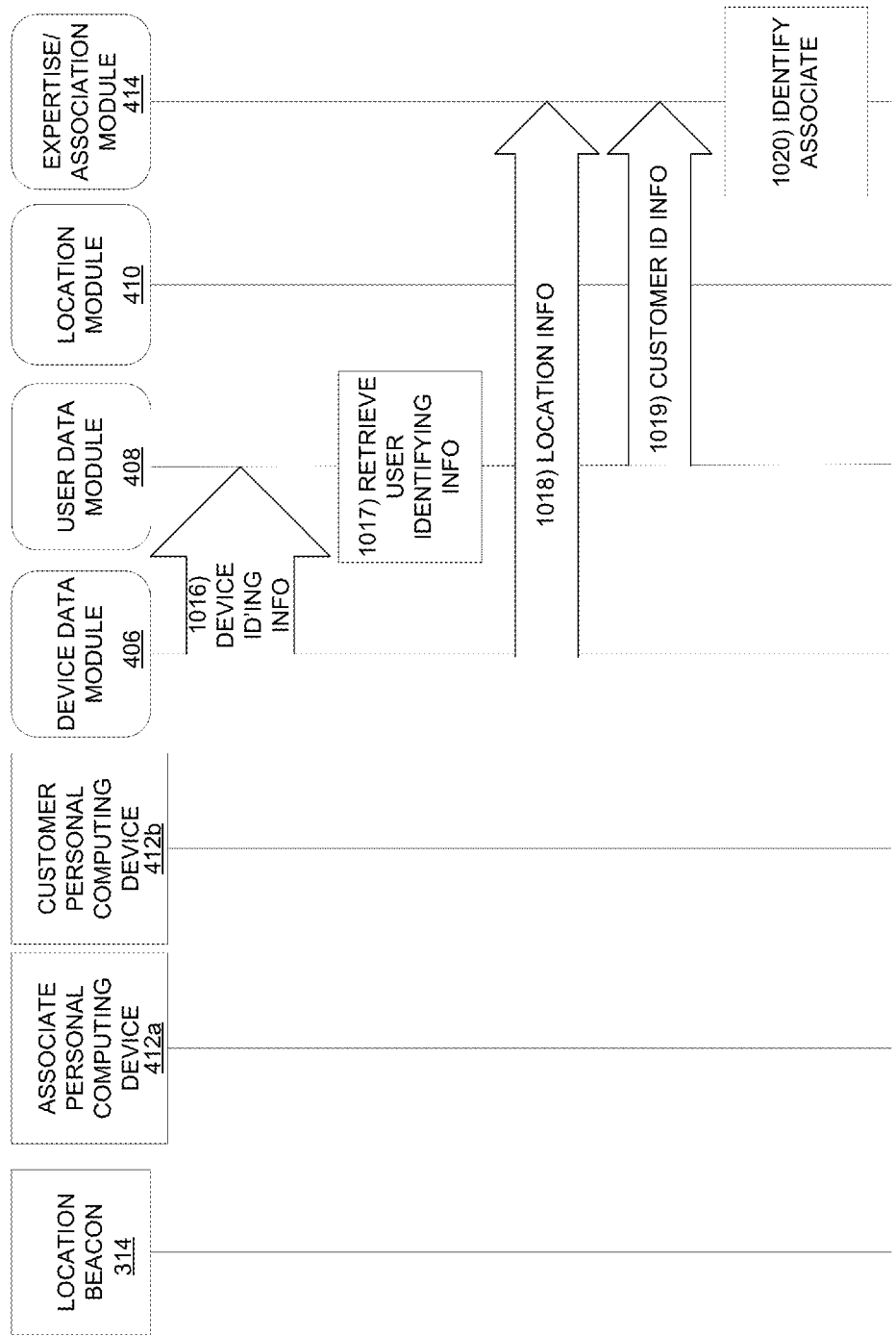

Referring to FIG. 10D, the device identifying information retrieved associated with the personal computing device, may be transmitted, for instance, to the user data module 408 in step 1016. The user data module 408 may receive the device identifying information and use it to identify a customer user associated with the personal computing device. Information associated with the identified user may be retrieved in step 1017.

Figure 10E:
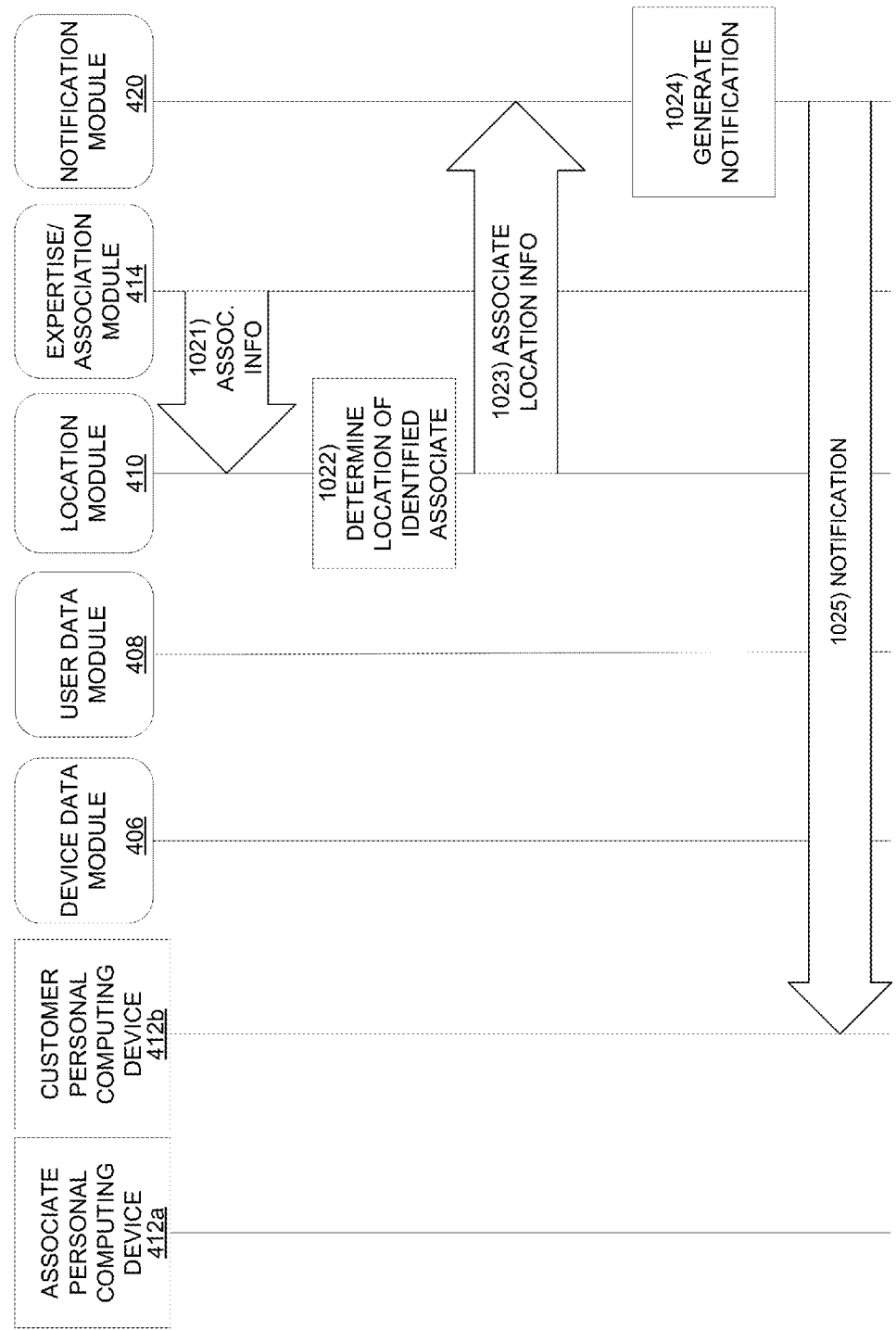

In step 1018, the customer location information may be transmitted to the expertise/association module 414 and, in step 1019, the customer user identification information may be transmitted to an expertise/association module 414. The expertise/association module 414 may then identify, based on the customer information, one or more banking associates or associate users that are associated with the particular customer in step 1020. For instance, the expertise/association module 414 may identify a financial advisor of the identified customer. With reference to FIG. 10E, the associate information may be transmitted to the location module in step 1021 and, in step 1022, a location of the identified associate may be determined. The location information of the identified associate may be transmitted to a notification module 420 in step 1023. The notification module may then generate a notification including the location of the identified associate in step 1024. The generated notification may be transmitted to the personal computing device 412*b* of the customer in step 1025.

Figure 11:
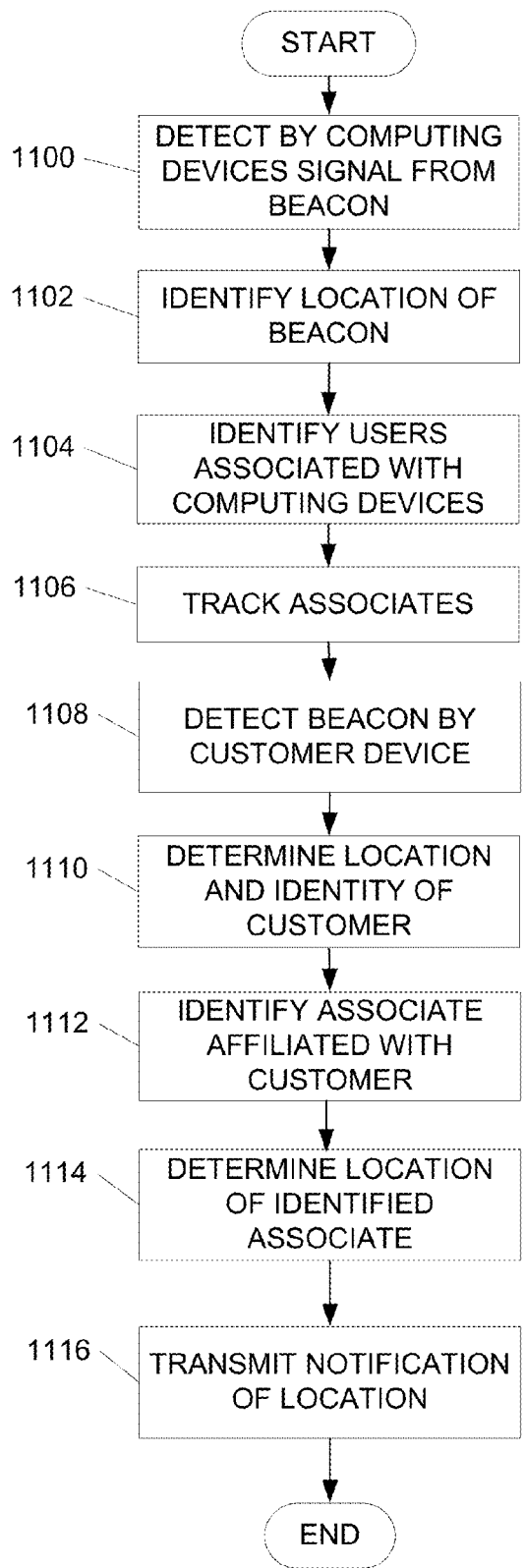
FIG. 11 illustrates one example method of identifying and/or locating an associate user associated with an identified customer user, according to one or more aspects described herein.

FIG. 11 illustrates one example method of identifying and/or locating a banking associate or associate user associated with an identified customer user, according to one or more aspects described herein. In step 1100, a plurality of personal computing devices may detect a signal emitted from a location beacon, such as beacon 314 in FIG. 3. The plurality of personal computing devices may be associated with a plurality of employees or associate users associated with the entity at which the beacon is located (e.g., employees or associates of the financial institution at which the beacon is located).

As discussed above, the signal may be a low-power radio signal that may only be detectable when the detecting device (e.g., the personal computing device) is within a predetermined proximity of the beacon, which may be a relatively small distance. In step 1102, the location of the beacon and, thus, the personal computing devices detecting the signal, may be determined. The location may be determined in various ways, as discussed above.

In step 1104, an associate user associated with each personal computing device of the plurality of personal computing devices may be identified. As discussed above, the associate users may be identified based on the unique identifier associated with the personal computing device, registration records or information, online or mobile banking information provided, or the like. In some examples, the user may be an associate or other employee of the entity at which the beacon is located (e.g., an employee or banking associate of the financial institution at which the location beacon is positioned). Accordingly, the associate user may be identified based on an employee number associated with the personal computing device, or other unique identifier.

In step 1106, the identified associate users associated with the personal computing devices may be tracked, such as via GPS, so that the location of any of the associate users may be known continuously or determined at any time (e.g., in real-time or near real-time). As discussed above, the tracking aspect may be performed with the knowledge and/or permission of the associate user and, in some arrangements, may be performed when the user is at work, within the building, during business hours, or during various other limited time periods.

In step 1108, the signal emitted from the location beacon may be detected by a personal computing device of a customer user. For instance, upon entering the building in which the location beacon is located, or upon coming within a predefined proximity of the location beacon, the personal computing device of the customer user may detect the signal from the beacon. In step 1110, the location and identity of the customer user may be determined, similar to various arrangements for determining a location and/or identity of a user discussed above.

In step 1112, one or more associate users associated with the identified customer user may be identified. In some examples, the one or more associate users may have a preexisting business relationship with the identified customer user (e.g., may be the financial advisor of the customer user). In other examples, the one or more associate users may be identified based on historical transaction data of the user that may be used to match the customer user with one or more associate users having knowledge or expertise in areas that might be of assistance to the customer user (e.g., the customer user makes regular mortgage payments so an associate familiar with mortgages, refinancing options, or the like) may be identified. The one or more associate users may be identified, in some arrangements, by the expertise/association module 414 in FIG. 4.

In step 1114, a location of the identified one or more associate users may be determined. For instance, as discussed above, the system may track the location of the plurality of associate users so that the location of any of the associate users may be determined at any time. Accordingly, once the associate users associated with the customer user have been identified, a location of the one or more identified associate users may be determined. In step 1116, the determined location of the one or more associate users may be transmitted to the customer user. For instance, a notification may be generated and transmitted to the customer user, or personal computing device of the customer user, indicating whether the identified associate user(s) is on the premises and providing information regarding the location of the one or more identified associate users. For instance, the notification may indicate that the identified associate user is in his or her office, is out of the building, is at a particular teller window, or the like.

Figure 12:
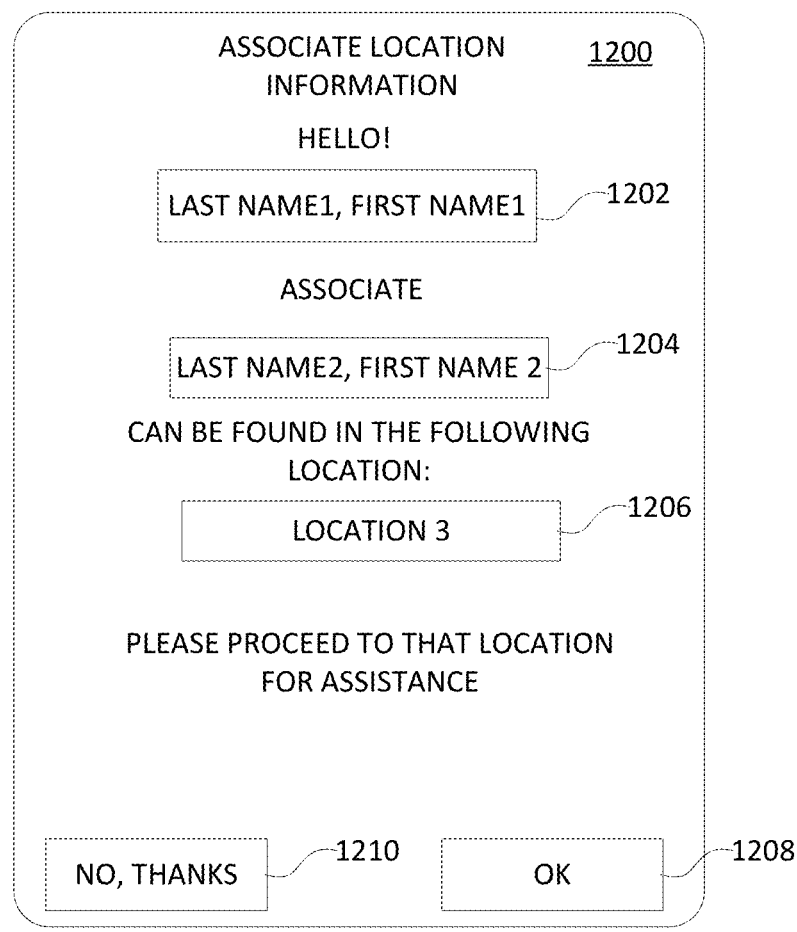
FIG. 12 illustrates one example user interface including a notification that may be transmitted to a customer user indicating a location of an associate user, according to one or more aspects described herein.

FIG. 12 illustrates one example notification that may be transmitted to a customer user indicating a location of an associate user, according to one or more aspects described herein. For instance, the notification may be transmitted to the personal computing device of the customer user. The interface 1200 includes field 1202 in which a name of the customer user to whom the notification has been transmitted is displayed. Interface 1200 further includes field 1204 in which the name of an identified associate user is displayed. Accordingly, the customer user may be aware of the name of the person they will be working with. Further, interface 1200 includes field 1206 in which the current location of the identified associate user is provided. In some examples, a diagram or layout of the location may be provided to direct the customer user to the appropriate location.

If the customer user intends to move to the designated location and work with the identified associate user, the customer may select "OK" option 1208. Alternatively, if the user does not intend to meet with the identified associate user (e.g., perhaps the user has business at the banking center that does not require speaking with the identified associate user), the customer user may select "NO, THANKS" option 1210 in order to close out of the interface. In some examples, selection of option 1210 may cause a notification to be transmitted to the identified associate user indicating that the customer user will not be meeting with him or her at that time.

Although interface 1200 includes the name of one identified associate user, the interface may include additional names of identified associate users, as desired. Further, if the identified associate user is not at the location at the time the customer user personal computing device detects the location beacon signal, the notification may include an indication that the identified associate user is away and/or may provide alternate associate users. Additionally or alternatively, one or more notifications may be transmitted to the associate user identifying the customer and/or the physical presence of the customer at the location.

Figure 13:
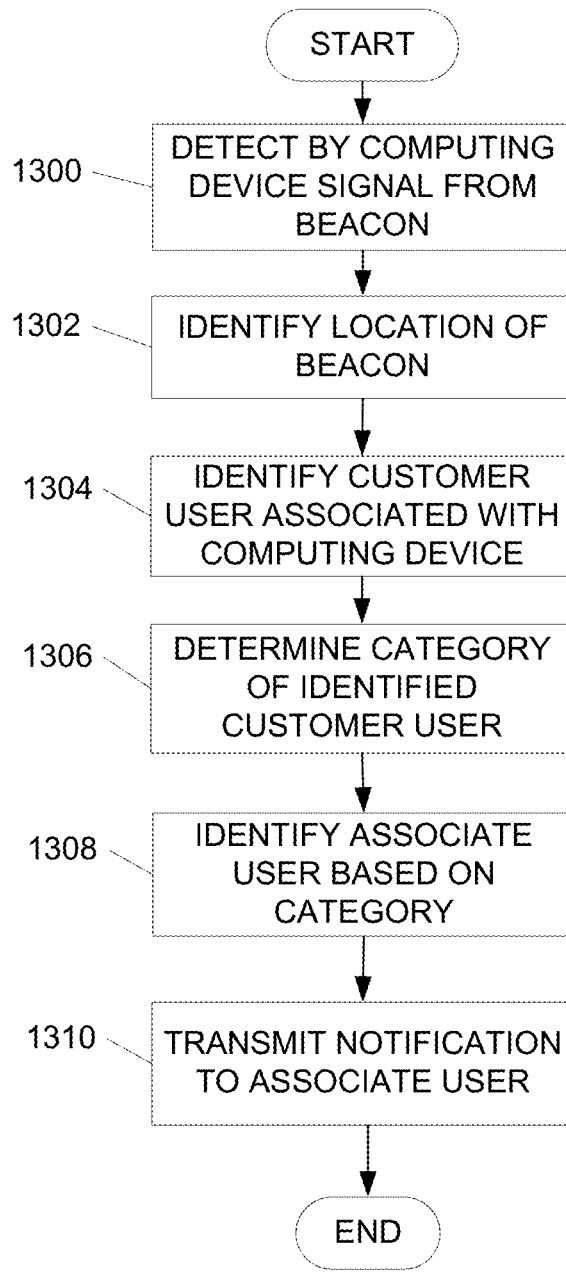
FIG. 13 illustrates one example method of identifying an associate user to assist a customer user based on a category of the customer user, according to one or more aspects described herein.

FIG. 13 illustrates one example method of identifying an associate user to assist a customer user according to one or more aspects described herein. In step 1300, a personal computing device of a customer user detects a signal from a location beacon, such as beacon 314 in FIG. 3. As discussed above, the signal may be a low-power radio signal that may only be detectable when the detecting device (e.g., the personal computing device) is within a predetermined proximity of the beacon, which may be a relatively small distance. In step 1302, the location of the beacon and, thus, the personal computing device, may be determined. The location may be determined in various ways, as discussed above.

In step 1304, a customer user associated with the personal computing device may be identified. As discussed above, the user may be identified based on the unique identifier associated with the personal computing device, registration records or information, online or mobile banking information provided, or the like. In step 1306, a customer category of the identified customer user may be determined. As discussed above, the customer category may be based on longevity as a customer, amount of funds in accounts at the financial institution associated with the customer user, types of accounts associated with the customer user, number of accounts of the customer user, and the like. In some examples, two, three or more categories of customer may be defined. Accordingly, a customer may be assigned one of the defined categories.

Based on the determined customer category, an associate user qualified to assist the customer user may be identified in step 1308. The associate user qualified to assist the identified customer user may be identified based on one or more areas of knowledge or expertise of the associate user, a rank or level of the associate user within the financial institution, a position of the associate user within the financial institution, or the like. For instance, a customer user having a high or highest ranking category may work with a banking center manager or other high level associate within the financial institution.

Upon identifying the appropriate associate user to greet and/or assist the customer user, a notification may be transmitted to the identified associate user in step 1310. In some examples, the notification may include the identity of the customer user, the category of the customer user and/or the location of the customer user.

Figure 14:
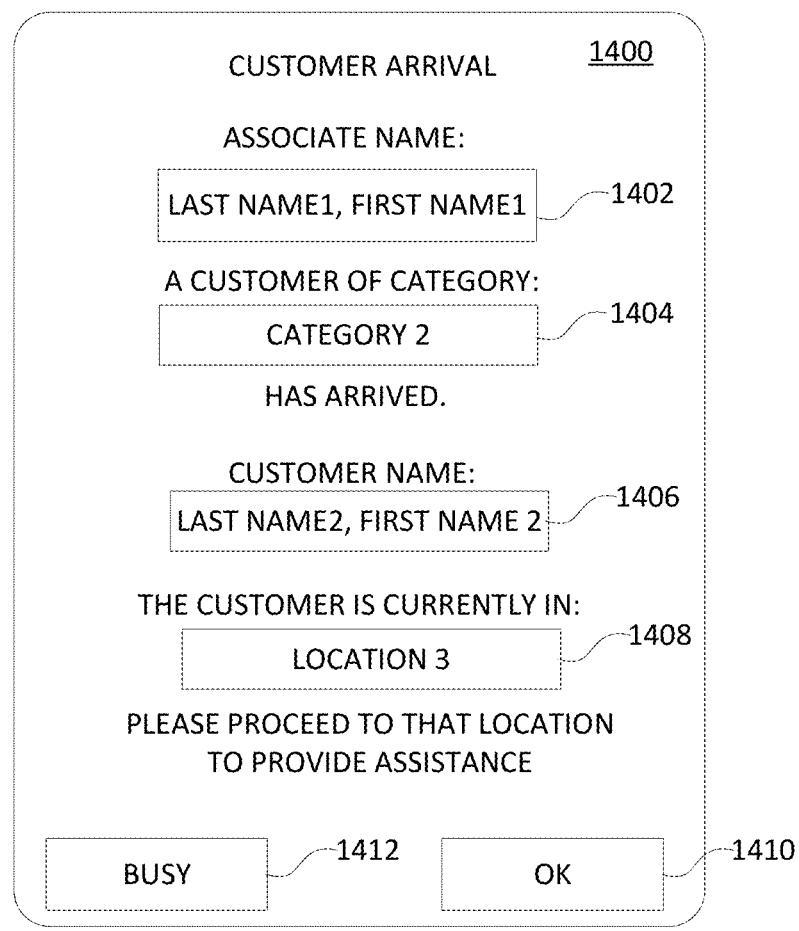
FIG. 14 illustrates one example user interface including a notification that may be transmitted to an identified associate user, according to one or more aspects described herein.

FIG. 14 illustrates one example user interface including a notification that may be transmitted to the identified associate user according to one or more aspects described herein. For instance, the notification may be transmitted to a personal computing device of the associate user. The interface 1400 includes field 1402 in which the name of the associate user to which the notification is being transmitted is provided. In field 1404, the identified category of the identified customer user is displayed. In field 1406, the name of the identified user is also provided. Field 1408 indicates the current location of the identified user. The current location may be determined based on a detection, by the personal computing device of the customer user, of a particular location beacon within the facility (e.g., in facilities having multiple location beacons distributed throughout) or may be based on GPS or other data associated with the personal computing device of the customer user.

Interface 1400 further includes a request for the identified associate user to go to the identified location of the customer user and greet and/or assist the customer user. If the identified associate user is able to assist (e.g., he or she is not already assisting a customer), the associate user may select "OK" option 1410. If the associate user is unable to assist at that time (e.g., the associate user is already assisting a customer, or the like), the associate user may select "BUSY" option 1412. Selection of option 1412 may prompt the system to identify another associate user to greet and/or assist the customer user and a similar notification may be transmitted to the other identified associate user.

Below are various example arrangements in which the location determination and user identification system may be implemented. The arrangements discussed below are merely some example arrangements and should not be viewed as limiting the disclosure in any way. Various other arrangements may be implemented or used without departing from the invention.

As discussed above, the location determination and user identification system may implement proximity positioning systems, or features associated therewith, to identify a user and determine a location of a user. Additional services and/or functionality may then be provided to the user and/or a financial institution or other entity implementing the system, based on this information.

For example, as discussed above, a location and identity of a user may be determined, based on a personal computing device of the user detecting a signal from a location beacon. In some arrangements, the user may be a banking associate, employee, or other associate user of the entity (e.g., financial institution) implementing the system. Accordingly, the system may continuously track, or determine at any time, a location of the associate user (e.g., using GPS technology via the associate user's personal computing device).

For instance, in some arrangements, a banking center or branch of a financial institution may have one or more security guards positioned at one or more locations within the banking center. In conventional systems, these security guards may be required to "check in" or inform a central system, supervisor, branch manager, or the like, if their location at various times throughout the day. The arrangements described herein permit the system to determine, at any time, the location of the one or more security guards (in real-time or near real-time). Accordingly, if an issue arises, the system may be able to identify the nearest security guard to respond. Additionally or alternatively, the system may determine that the security guard is away from an expected location, which may indicate an issue has arisen.

Further, tracking the location of one or more associate users may permit the system to identify a location of people with a particular knowledge base or expertise, should an inquiry arise in that area. As discussed above, if a question arises regarding, for instance, a mortgage (either from a customer user or another associate user without the depth of knowledge in that particular area) a location of an associate user being tracked by the system and having the desired knowledge may be quickly determined. In some arrangements, a notification including details of the inquiry may be transmitted to the identified associate user, such as via the personal computing device of the associate user.

In still other examples, the system may be used to track associate effectiveness. For instance, the system may determine how often a particular associate user is away from a desired location when needed, how long it takes associate users to respond to inquiries, and the like. In one example, the system may store information associated with inquiries, wait times for customers, locations of the associate users, and the like. This information may then be used to determine whether particular associate users should be assigned to certain areas (e.g., areas other than the areas to which they are currently assigned). For example, an associate user with a particular expertise may generally be located at a customer service desk throughout the day. The historical information gathered by the system may indicate that that associate user is often requested to come to a greeting area to address customer inquiries. Accordingly, the associate user may be assigned to the greeting area, rather than the customer service desk, in order to improve the customer service experience. In some examples, the data may indicate specific times of a day, days of the week, days of the month, or the like, when associates should be at a particular location.

The systems, methods, and the like, described herein may further be used to identify a location and/or identity of a customer user. In some arrangements, this information may be coupled with the location, identity and/or tracking information of the associate users to provide enhanced customer service.

For instance, a customer user may enter a banking center or branch of a financial institution and the personal computing device of the customer user may detect a signal from a location beacon. As discussed above, this may prompt the system to identify a location of the customer user, as well as an identity of the customer user. As discussed above, in some examples, the system may then determine one or more associate users associated with the identified customer. For instance, the system may identify associate users having a preexisting relationship with the customer, such as the financial advisor of the customer. The location of the one or more associate users may be determined and may be transmitted to the customer user (e.g., to the personal computing device of the customer user) so that the customer user can proceed directly to the associate user.

In other examples, one or more customers of the financial institution may be associated with a customer category. Upon determining the identity of the customer, the category of the customer may also be determined. Accordingly, the system may identify and/or notify one or more associate users assigned to work with that category of customer, having a knowledge base particular to that category of customer, or the like.

In some examples, notifications provided to an associate user (e.g., based on an identity of a customer whose physical presence has been detected, based on a category of customer whose physical presence has been detected, or the like) may include transaction history information associated with the customer. Accordingly, the associate user may be aware of previous transactions, inquiries, and the like, made by the customer user and, as desired, may follow-up with the customer user to ensure that all issues have been addressed, the customer user is satisfied, and the like. For instance, if a customer user was previously in the banking center to inquire about an auto loan, on the next visit to the banking center, the associate user may be aware of this previous inquiry and may ask the customer user if they received all the information needed, if they need any other assistance, provided updated information (e.g., interest rates, or the like), and the like.

Although various aspects described herein relate to customer users, non-customer users may also implement various aspects of the system. For instance, a user who might not have an account at the financial institution, but who may use one or more services at the bank (e.g., automated teller machine (ATM), check cashing, or the like) might not be considered a customer of the bank or a customer user but, as a non-customer user, may be able to use aspects of the systems and arrangements discussed herein. For instance, the non-customer user may register with the location determination and user identification system and may be identified upon entering the banking center. Accordingly, associate users who may have a relationship with the non-customer user may be identified and a location provided to the non-customer user. Various other examples of use of the arrangements described herein by non-customer users may be implemented without departing from the invention.

Further, the arrangements discussed herein may include detection of a signal by a personal computing device and transmitting the signal, or data associated therewith, to another portion of the system or another device, to determine the location of the beacon and/or device, as well as the identity of the user associated with the device. However, in some arrangements, the personal computing device may be configured to determine the location of the beacon, and thus, the location of the personal computing device, based on the received signal (e.g. by matching a signal that may be unique to the beacon with a stored list of beacons and associated locations). Some or all aspects of this arrangement may be performed by one or more applications associated with the personal computing device, such as an online or mobile banking application. The application may then determine the identity of the user (e.g., with or without accessing other devices) and may transmit user information to another device or component of the system to provide the additional functionality, as discussed herein.

The various arrangements discussed herein aid in improving customer service experiences for a user, as well as providing improvements in efficiently managing customer inquiries, work flow, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
    receiving, by a location determination and user identification system having at least one processor, data associated with a signal detected by a personal computing device, the signal being emitted from a location beacon at a banking center of a financial institution;
    determining, by the location determination and user identification system, a location of the personal computing device based on the received data associated with the signal emitted from the location beacon, wherein the location of the personal computing device is within a predefined proximity of a location of the location beacon;
    extracting, by the location determination and user identification system, a unique identifier associated with the personal computing device, the unique identifier including an international mobile station equipment identity (IMEI) of the personal computing device;
    determining, by the location determination and user identification system and based on the extracted unique identifier associated with the personal computing device, an identity of an associate user associated with the personal computing device;
    extract, based on the identity of the associate user associated with the personal computing device and from pre-stored information, a knowledge area associated with the associate user;
    receiving, by the location determination and user identification system, a request for assistance in a first knowledge area;
    determining, by the location determination and user identification system, whether the extracted knowledge area matches the first knowledge area;
    tracking, during a predetermined time period, a location of the associate user associated with the personal computing device via the personal computing device;
    determining, by the location determination and identification system, whether the associate user is at an expected location within the banking center at a predetermined time; and
    responsive to determining that the associate user is not at an expected location, requesting a location update from the associate user, the requested location update including a request for a reason the associate user is not in the expected location.

2. The method of claim 1, wherein requesting a location update from the associate user includes transmitting a request for a location update to the personal computing device.

3. The method of claim 1, further including receiving, from the associate user, the location update.

4. The method of claim 3, wherein the location update is received from the personal computing device.

5. The method of claim 1, wherein tracking the location of the associate user is performed using a Global Positioning System.

6. The method of claim 1, wherein tracking the location of the associate user includes tracking the location of the associate user when the personal computing device is within the predefined proximity of the location of the location beacon.

\* \* \* \* \*